(12) United States Patent
Lai et al.

(10) Patent No.: US 12,253,676 B2
(45) Date of Patent: Mar. 18, 2025

(54) VIRTUAL IMAGE DISPLAY SYSTEM WITH ENHANCED RESOLUTION FOR VIRTUAL REALITY AND AUGMENTED REALITY DEVICES

(71) Applicant: HES IP HOLDINGS, LLC, Austin, TX (US)

(72) Inventors: Jiunn-Yiing Lai, New Taipei (TW); Feng-Chun Yeh, Taipei (TW)

(73) Assignee: HES IP HOLDINGS, LLC, Austin, TX (US)

( * ) Notice: Subject to any disclaimer, the term of this patent is extended or adjusted under 35 U.S.C. 154(b) by 0 days.

(21) Appl. No.: 18/393,525

(22) Filed: Dec. 21, 2023

(65) Prior Publication Data

US 2024/0142778 A1 May 2, 2024

Related U.S. Application Data

(63) Continuation of application No. 18/017,840, filed as application No. PCT/US2021/052750 on Sep. 30, 2021, now Pat. No. 11,953,689.
(Continued)

(51) Int. Cl.
*G02B 27/01* (2006.01)
*G06V 10/10* (2022.01)
(Continued)

(52) U.S. Cl.
CPC ......... *G02B 27/0172* (2013.01); *G06V 10/16* (2022.01); *H04N 13/332* (2018.05); *H04N 13/351* (2018.05)

(58) Field of Classification Search
None
See application file for complete search history.

(56) References Cited

U.S. PATENT DOCUMENTS

| 4,953,961 A | 9/1990 | Ubhayakar |
| 6,454,411 B1 | 9/2002 | Trumbull |

(Continued)

FOREIGN PATENT DOCUMENTS

| CN | 102595178 A | 7/2012 |
| CN | 106371218 A | 2/2017 |

(Continued)

OTHER PUBLICATIONS

PCT/US2020/059317 Isr and Written Opinion issued on Feb. 5, 2021.
(Continued)

*Primary Examiner* — Krishna P Neupane
(74) *Attorney, Agent, or Firm* — Chen Yoshimura LLP

(57) ABSTRACT

A virtual image display system for displaying virtual images having expanded resolution and field of view is disclosed. The virtual image display system comprises a first light emitter emitting a plurality of first light signals to be projected into a viewer's eye; a first light direction modifier varying a light direction of the plurality of first light signals emitted from the first light emitter. The light direction of first light signals is varied at a first scan rate with respect to time within a first spatial range for displaying a first image frame with a predetermined number of light signals and the first scan rate is non-constant.

11 Claims, 15 Drawing Sheets

Related U.S. Application Data

(60) Provisional application No. 63/085,172, filed on Sep. 30, 2020.

(51) Int. Cl.
    *H04N 13/332*     (2018.01)
    *H04N 13/351*     (2018.01)

(56) References Cited

U.S. PATENT DOCUMENTS

| | | | |
|---|---|---|---|
| 9,319,674 B2 | 4/2016 | Kim et al. | |
| 9,395,543 B2 | 7/2016 | Lamb et al. | |
| 9,576,398 B1 | 2/2017 | Zehner et al. | |
| 9,800,844 B2 | 10/2017 | Nakahara et al. | |
| 10,222,621 B2 | 3/2019 | Wang et al. | |
| 10,554,940 B1 | 2/2020 | Ghazaryan | |
| 10,606,161 B2 | 3/2020 | Hirata et al. | |
| 11,016,380 B2 | 5/2021 | Hirata et al. | |
| 11,079,601 B2 | 8/2021 | Greenberg | |
| 11,256,092 B2 | 2/2022 | Shamir et al. | |
| 11,435,572 B2 | 9/2022 | Yeoh et al. | |
| 11,493,769 B2 | 11/2022 | Wen et al. | |
| 2002/0024708 A1 | 2/2002 | Lewis et al. | |
| 2002/0122217 A1 | 9/2002 | Nakajima | |
| 2002/0180868 A1* | 12/2002 | Lippert | G02B 26/08 348/383 |
| 2004/0179254 A1 | 9/2004 | Lewis et al. | |
| 2008/0117289 A1* | 5/2008 | Schowengerdt | G02B 26/005 348/E13.032 |
| 2010/0103077 A1 | 4/2010 | Sugiyama et al. | |
| 2010/0149073 A1 | 6/2010 | Chaum et al. | |
| 2011/0032706 A1 | 2/2011 | Mukawa | |
| 2011/0273722 A1 | 11/2011 | Charny et al. | |
| 2013/0044101 A1 | 2/2013 | Kim et al. | |
| 2014/0198017 A1 | 7/2014 | Lamb et al. | |
| 2014/0211289 A1* | 7/2014 | Hino | G02B 26/0816 359/225.1 |
| 2015/0022783 A1 | 1/2015 | Lee et al. | |
| 2015/0169070 A1 | 6/2015 | Harp et al. | |
| 2016/0033771 A1* | 2/2016 | Tremblay | G02B 26/10 359/851 |
| 2016/0150201 A1 | 5/2016 | Kilcher et al. | |
| 2016/0178908 A1 | 6/2016 | Dobschal | |
| 2016/0212394 A1 | 7/2016 | Nakahara et al. | |
| 2016/0238845 A1 | 8/2016 | Alexander et al. | |
| 2016/0284129 A1 | 9/2016 | Nishizawa et al. | |
| 2016/0377865 A1 | 12/2016 | Alexander et al. | |
| 2017/0078651 A1 | 3/2017 | Russell | |
| 2017/0188021 A1 | 6/2017 | Lo et al. | |
| 2017/0285343 A1 | 10/2017 | Belenkii et al. | |
| 2017/0299872 A1 | 10/2017 | Ou et al. | |
| 2017/0307890 A1 | 10/2017 | Wang et al. | |
| 2018/0032812 A1 | 2/2018 | Sengelaub et al. | |
| 2018/0081322 A1 | 3/2018 | Robbins et al. | |
| 2018/0120559 A1 | 5/2018 | Yeoh et al. | |
| 2018/0182174 A1 | 6/2018 | Choi | |
| 2018/0246336 A1 | 8/2018 | Greenberg | |
| 2018/0249150 A1 | 8/2018 | Takeda et al. | |
| 2018/0252926 A1 | 9/2018 | Alexander et al. | |
| 2018/0284441 A1 | 10/2018 | Cobb | |
| 2018/0350032 A1 | 12/2018 | Bastani et al. | |
| 2019/0064435 A1 | 2/2019 | Karafin et al. | |
| 2019/0084419 A1 | 3/2019 | Suzuki et al. | |
| 2019/0121132 A1 | 4/2019 | Shamir et al. | |
| 2019/0146224 A1 | 5/2019 | Komori et al. | |
| 2019/0172216 A1 | 6/2019 | Ninan et al. | |
| 2019/0187473 A1 | 6/2019 | Tomizawa et al. | |
| 2019/0243228 A1 | 8/2019 | Hirata et al. | |
| 2019/0281279 A1 | 9/2019 | Peuhkurinen et al. | |
| 2019/0285897 A1 | 9/2019 | Topliss et al. | |
| 2019/0287495 A1 | 9/2019 | Mathur et al. | |
| 2019/0293939 A1 | 9/2019 | Sluka | |
| 2019/0320165 A1 | 10/2019 | French et al. | |
| 2020/0090569 A1 | 3/2020 | Hajati et al. | |
| 2020/0117012 A1 | 4/2020 | Wen et al. | |
| 2020/0138518 A1 | 5/2020 | Lang | |
| 2020/0233296 A1 | 7/2020 | Hirata et al. | |
| 2020/0329961 A1 | 10/2020 | Oz et al. | |
| 2021/0003900 A1 | 1/2021 | Chen | |
| 2021/0055555 A1 | 2/2021 | Chi et al. | |
| 2022/0311992 A1 | 9/2022 | Lai et al. | |
| 2022/0326513 A1 | 10/2022 | Yeoh et al. | |
| 2023/0049899 A1 | 2/2023 | Yeh et al. | |

FOREIGN PATENT DOCUMENTS

| | | |
|---|---|---|
| CN | 107347152 A | 11/2017 |
| CN | 107438796 A | 12/2017 |
| CN | 108427498 A | 8/2018 |
| CN | 109073901 A | 12/2018 |
| CN | 109477961 A | 3/2019 |
| CN | 109716244 A | 5/2019 |
| CN | 110168419 A | 8/2019 |
| CN | 110168427 A | 8/2019 |
| JP | H4-501927 A | 4/1992 |
| JP | H08-166556 A | 6/1996 |
| JP | H09-105885 A | 4/1997 |
| JP | 2004-527793 A | 9/2004 |
| JP | 2007-121581 A | 5/2007 |
| JP | 2010-117542 A | 5/2010 |
| JP | 2011013688 A | 1/2011 |
| JP | 5925389 B2 | 5/2016 |
| JP | 2016180939 A | 10/2016 |
| JP | 2017-056933 A | 3/2017 |
| JP | 2018508036 A | 3/2018 |
| JP | 2018132756 A | 8/2018 |
| JP | 2018-533062 A | 11/2018 |
| JP | 2020-509790 A | 4/2020 |
| KR | 20120069133 A | 6/2012 |
| TW | 201310974 A | 3/2013 |
| TW | 201435654 A | 9/2014 |
| TW | 201716827 A | 5/2017 |
| TW | 201738618 A | 11/2017 |
| TW | 201809214 A | 3/2018 |
| TW | 202016603 A | 5/2020 |
| WO | 91/04508 A2 | 4/1991 |
| WO | 2016105281 A1 | 6/2016 |
| WO | 2018/175265 A1 | 9/2018 |
| WO | 2021092314 A1 | 5/2021 |
| WO | 2022170284 A1 | 8/2022 |

OTHER PUBLICATIONS

TW 109141615 Non-Final Office Action issued on Aug. 23, 2022.
PCT/US2021/052750 International Search Report and Written Opinion issued on Dec. 28, 2021.
PCT/US2021/052750 International Preliminary Report issued on Dec. 6, 2022.
TW 110136602 Non-Final Office Action issued on Jun. 14, 2023.
PCT/US2022/015717 International Search Report and Written Opinion isuued on May 23, 2022.
Kim, J et al., "Foveated AR: Dynamically-Foveated Augmented Reality Display" pp. 1-15 [online]. Jul. 12, 2019; ACM Transactions on Graphics vol. 38, Issue 4 [Retrieved on Apr. 9, 2022]. Retrieved from the internet <url: https://dl.acm.org/doi/10.1145/3306346.3322987>; DOI: https://doi.org/10.1145/3306346.3322987.
TW 111104638 office action issued on Aug. 30, 2023.
EP 20886006.4 European Search Report issued on Nov. 21, 2023.
TW 112112456 Non Final Office aciton issued on Nov. 27, 2023.
EP 22750600.3 European Search Report issued on Jan. 30, 2024.
Japanese Office Action, dated Jun. 4, 2024 in a counterpart Japanese patent application, No. 2022-506646.
European Search Report for the corresponding EP application No. EP 21876437.1, issued on Sep. 30, 2024.

* cited by examiner

VIRTUAL IMAGE DISPLAY SYSTEM WITH ENHANCED RESOLUTION FOR VIRTUAL REALITY AND AUGMENTED REALITY DEVICES

RELATED APPLICATIONS

This application claims the benefit of provisional application 62/931,228, filed on Nov. 6, 2019, titled "SYSTEM AND METHOD FOR PROJECTING BINOCULAR 3D IMAGES WITH DEPTHS", U.S. application Ser. No. 17/261,564 filed on Jan. 19, 2021 Title: "SYSTEM AND METHOD FOR DISPLAYING AN OBJECT WITH DEPTHS", and provisional application 63/085,172, filed on Sep. 30, 2020, titled "SYSTEMS AND METHODS FOR PROJECTING VIRTUAL IMAGES WITH MULTIPLE DEPTHS", and incorporated herein by reference at their entirety.

BACKGROUND OF THE INVENTION

Field of the Invention

The present invention is related to a virtual image display system for virtual reality and augmented reality devices; more specifically, a virtual image display system capable of producing virtual images having expanded field of resolution and view without sacrificing the image quality of the virtual images.

Description of Related Art

Head-mounted display devices for virtual reality and augmented reality have been one of the key research and development areas in recent years. The demands for display having higher resolution, wider field of view, and larger view angle for the eyes have always been a main focus for the development of the head-mounted display devices. Larger field of view increases the sense of immersion and allows the users to perceive more image information. Larger view angle for the eyes allows the users to arbitrarily move their eyes during observation without image lost. A variety of methods and systems for expanding the field of view and view angle in head-mounted display devices have been proposed; however, due to technical limitation of the light emitters used in the head-mounted display devices, the resolution of the image cannot be expanded along with the expansion of the field of view and view angle of the head-mounted display devices easily. As a result, head-mounted display devices having larger field of view and view angle for the eyes produce image having less clarity. Therefore, it may be desirable to have a virtual image display system with expanded field of view and enhanced image resolution.

SUMMARY

In one embodiment of the present invention, the present invention discloses a Micro-Electro-Mechanical Systems (MEMS) based virtual image display system for overcoming the above-mentioned limitations. The virtual image display system comprises a first light emitter for emitting a plurality of first light signals to be projected into a viewer's first eye and a first light direction modifier for varying a light direction of the plurality of first light signals with respect to time at a scan rate to form a first image frame. The first light emitter emits the plurality of first light signals as light pulses at a constant rate under normal condition, or the first light emitter emits the plurality of first light signals as light pulses with varying frequency to adjust the number of first light signals per cross-section area in a predetermined region in the first image frame. The first image frame is consisted of a predetermined number of light signals. The first light direction modifier may be rotating in a first coordinate plane or a second coordinate plane with respect to an axis of rotation. The light direction of the plurality of first light signals is varied within a first spatial range, which is related to the maximum spatial range or maximum angle that the first light direction modifier is able to rotate in the first coordinate plane or second coordinate plane. The rotation of the first light direction modifier causes the light direction of the plurality of first light signals to change in the first coordinate or the second coordinate.

According to an embodiment, the first light direction modifier varies the first coordinate component or the second coordinate component of the plurality of first light signals with respect to time at the scan rate that is non-constant. The frequency of light emission of the first light emitter may also be non-constant.

According to an embodiment, multiple MEMS mirrors along with a one light emitter is implemented. The virtual image display system may comprise a first light emitter, a first light direction modifier, a third light direction modifier and a first light switch. The first light emitter is used for emitting a plurality of first light signals. The first light switch is capable of periodically redirect a first portion of the first light signals to a first light direction modifier during the first time period and then redirect a second portion of the first light signals to a third light direction modifier during the second time period. The first light direction modifier and a third light direction modifier are implemented for varying a light direction of the plurality of first light signals with respect to time to form a first image frame consisting of a predetermined number of light signals. The first light direction modifier varies a light direction of the first portion of first light signals at a first scan rate within a first spatial range during the first time period; and the third light direction modifier varies a light direction of the second portion of first light signals at a fifth scan rate within a third spatial range during the second time period for displaying a first image frame with a predetermined number of light signals.

In another embodiment of the present invention, the resolution and FOV may be expanded by using multiple light emitters along with one MEMS minor. The virtual image display system may comprise a first light emitter and a third light emitter for respectively emitting a plurality of first light signals and a plurality of third light signals to one viewer's first eye to form a first image frame. The first light emitter and the third light emitter may respectively be LBS projectors. The FOV is expanded by using one light direction modifier. The plurality of first light signals and the plurality of third light signals from the first light emitter and the third light emitter are respectively projected on the first light direction modifier. The light direction of the plurality of first light signals is varied within a first spatial range at a first scan rate, the light direction of the plurality of third light signals is varied within a third spatial range at the first scan rate as well. In the present embodiment, the first spatial range is equal to the third spatial range, which is the maximum spatial range or maximum angle that the first light direction modifier is able to turn.

In other variations of the present embodiment, an optical assembly may be disposed between the light emitter and the combiner mentioned above to alter an area of a predetermined cross section of a light path of the plurality of first light signals. Specifically, the optical assembly containing lens may be implemented for altering optical path of the plurality of first light signals from the first light emitter to the first combiner to change a projection area or a cross sectional size of each of the plurality of first light signals.

In some embodiments, the pixel in the first image frame and a corresponding pixel in the second image frame form a binocular virtual image pixel at a first depth which is related to a first angle between the first light signal and the second light signal projecting into the viewer's eyes.

In a variation embodiment of any one of the previous embodiments, the head-mounted display may comprise an integrated combiner for respectively reflecting light signals to both eyes of the viewer, replacing the first combiner and the second combiner. The head-mounted display may comprise a pair of virtual image display system for both eyes. The virtual image display system may be anyone of the virtual image display systems readily described above. The virtual image display system on the left may be responsible for producing an image frame to the second eye, and the virtual image display system on the right may be responsible for producing the image frame to the first eye. However, in one instance, the virtual image display system on the left may be responsible for producing an image frame to the first eye, and the virtual image display system on the right may be responsible for producing the image frame to the second eye.

The present embodiment may be applied to a support structure such as a head-mounted display for virtual reality and augmented reality devices. In this case, the virtual image display system is provided to both eyes of the viewer. The first light signal forming the pixel on the first image frame and the corresponding second light signal forming the pixel on the second image frame are perceived by the first eye and second eye of the viewer to form a binocular virtual image pixel at a first depth. The first depth is related to a first angle between the first light signal and the second light signal projecting into the viewer's eyes.

DETAILED DESCRIPTION OF THE PREFERRED EMBODIMENTS

Figure 1:
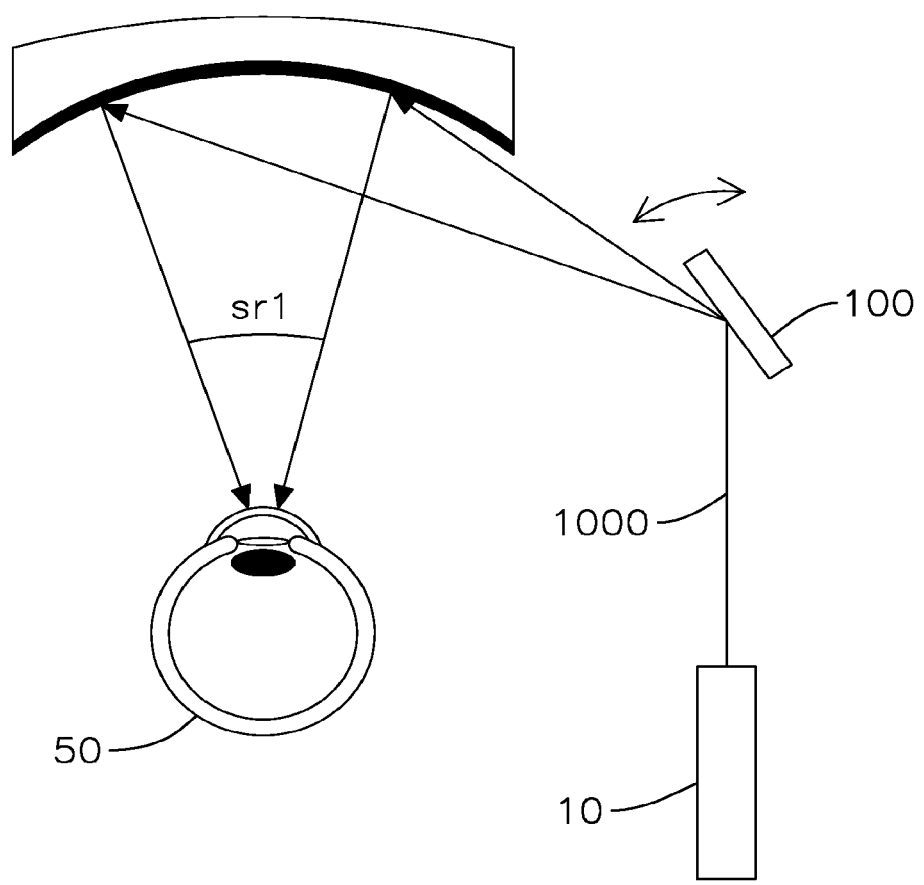
FIG. 1 is a schematic view of the virtual image display system in accordance to a first embodiment of the present invention.
Figure 2:
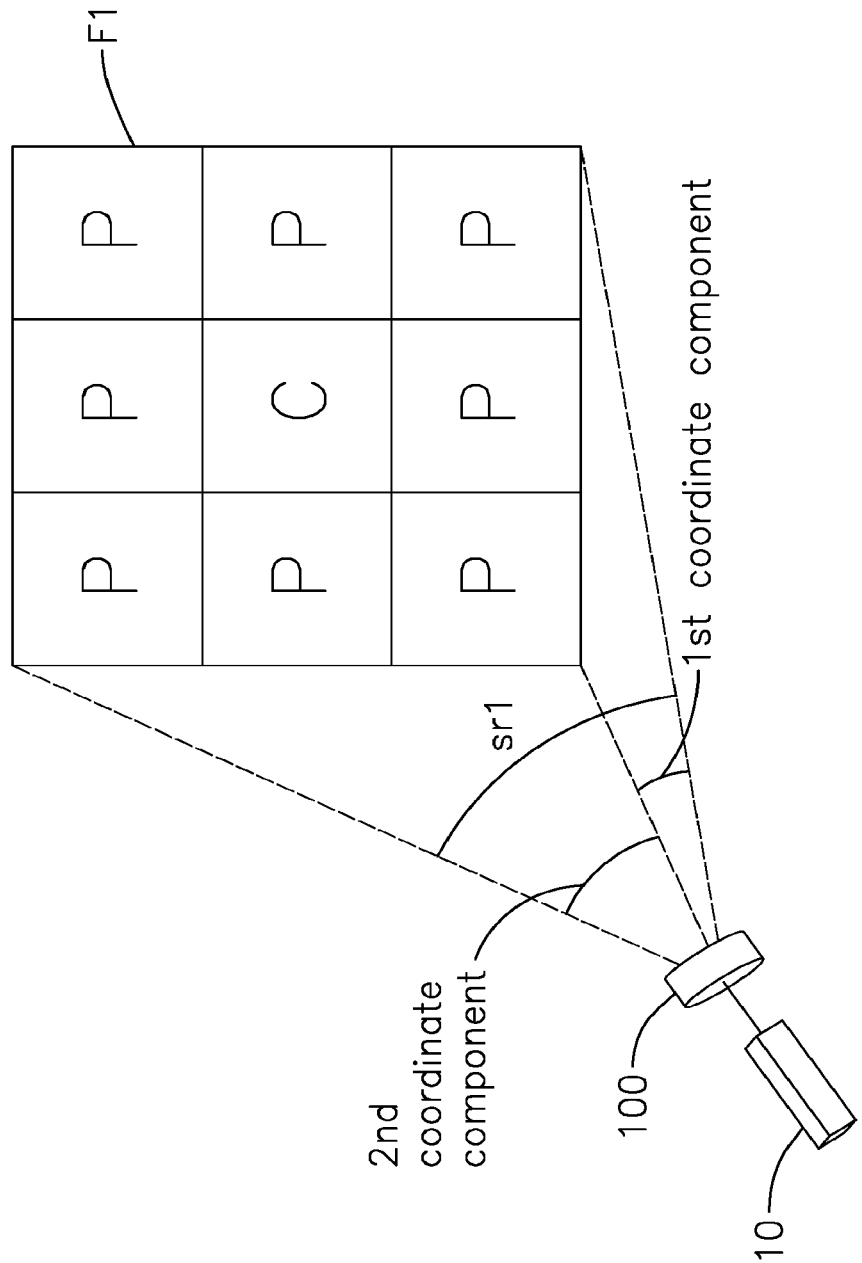
FIG. 2 is a schematic view of the central region and peripheral region of an image frame in accordance with the present invention.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

The present invention relates to systems and methods for expanding the resolution and field of view (FOV) of a virtual image having depth perception produced by a virtual image display system for virtual reality or augmented reality devices. The present invention can produce the virtual image with greater resolution and FOV relative to the prior art without sacrificing pixel density of virtual image. As a result, the quality of the virtual image produced in accordance with the present invention may be superior relative to the prior arts.

The light direction modifier mentioned in the present invention refers to mechanical or optical elements capable of dynamically changing the direction of light emitted by a light emitter with respect to time. An example of which may be, but not limited to, microelectromechanical systems (MEMS) mirrors. A typical MEMS minor may be able to change the direction of light in one axis or two separate axes (2-dimensional MEMS minor). As an example, a 2-dimensional MEMS mirror may be able to deflect laser beams to optical scanning angles of up to approximately 30° at high speeds in both axes. However, the maximum scanning angle in one axis may be larger (main scanning axis) than the other. The MEMS mirror technology is highly versatile and adaptable to various applications, such as projection displays, 3D scanning, and laser marking . . . etc. The principle for driving the movement of the MEMS mirror can be provided by various physical principles; examples of which may be electromagnetic, electrostatic, thermo-electric and piezo-electric effects. Each of the physical principles for driving the MEMS mirror may exhibit different advantages or disadvantages. The swing frequency or swing amplitude of the MEMS minor may be controlled by respectively applying different frequency of driving voltage/electromagnetic field and different amplitude of driving voltage/electromagnetic field to the MEMS mirror, which is readily well known in the art.

Notice that the phrase "scan rate" mentioned in the present discloser refers to the "swing frequency" of the MEMS mirror, which is related to the frequency of harmonic oscillation of the MEMS mirror. The phrase "scan rate" and "swing frequency" may be used interchangeably in the present discloser; both of which are related to an amount of spatial displacement in a unit of time. The phrase "first eye" and "second eye" mentioned in the present discloser refers to the two eyes of the user. In general, the "first eye" and the "second eye" may respectively refer to the right eye and the left eye of the viewer; or the "first eye" and the "second eye" may respectively refer to the left eye and the right eye of the viewer.

It is worth mentioning that different coordinate systems may be used to represent the light direction, spatial range, or displacement of the elements or devices disclosed in the present invention. For example, the coordinate systems may be X coordinate component and Y coordinate component in the Cartesian coordinate system, or θ coordinate component and φ coordinate component in the polar coordinate system. The X or θ coordinates may be expressed as the first coordinate component; and Y or φ may be expressed as the second coordinate component. In some cases, the X or θ coordinates may be expressed as the second coordinate component; and Y or φ may be expressed as the first coordinate component.

With reference to FIG. 1, the following embodiment discloses a MEMS based virtual image display system capable of producing virtual image having expanded resolution and FOV, while maintaining image quality. The MEMS mirror in the present embodiment may be two-dimensional MEMS. In the present embodiment, the frequency at which the light emitter project each light signal (pixel) of the image and/or the scan rate in the vertical/horizontal direction of the light signals is manipulated to compensate for pixel density degradation when the FOV of an image frame is expanded. The virtual image display system comprises a first light emitter 10 for emitting a plurality of first light signals 1000 to be projected into a viewer's first eye 50 and a first light direction modifier 100 for varying a light direction of the plurality of first light signals 1000 with respect to time at a scan rate to form a first image frame F1. For example, the first light emitter 10 may be a laser beam generator such as a laser beam scanners (LBS) projector. The first light emitter 10 emits the plurality of first light signals 1000 as light pulses at a constant rate under normal condition, or the first light emitter 10 emits the plurality of first light signals 1000 as light pulses with varying frequency to adjust the number of first light signals 1000 per cross-section area in a predetermined region (which corresponds to the pixel density) in the first image frame F1. The first image frame F1 is consisted of a predetermined number of light signals. Each of the light signals may represent a pixel of the first image frame F1. During the formation of the first image frame F1, the first light direction modifier 100 may be rotating in a first coordinate plane (e.g., horizontal plane) or a second coordinate plane (e.g., vertical plane) with respect to an axis of rotation. The light direction of the plurality of first light signals 1000 is varied within a first spatial range SR1, which is related to the maximum spatial range or maximum angle that the first light direction modifier 100 is able to rotate in the first coordinate plane or second coordinate plane. The rotation of the first light direction modifier 100 causes the light direction of the plurality of first light signals 1000 to change in the first coordinate (e.g., horizontal coordinate) or the second coordinate (e.g., vertical coordinate), depending on the setting.

According to this embodiment, the first light direction modifier 100 varies the first coordinate component or the second coordinate component of the plurality of first light signals 1000 with respect to time at the scan rate that is non-constant. The frequency of light emission of the first light emitter 10 may also be non-constant. The idea behind the present embodiment is when human eye views an target object, the visual axis of the eye is directed to the target object, causing the image of the target object being concentrated on the macula of the eye (which is the most sensitive part of the retina); and thus, the target object appears to be in the central region C of the vision. Relative to the target object in the image, other portions of the image may become less clear since these portions of the image may be projected to other parts of the retina that are less sensitive to the light. Based upon the nature of human vision described above, the virtual image display system in accordance with the present embodiment aims to provide a central portion of an image frame with a higher pixel density relative to the peripheral region P of the image frame, so the user of the present invention can see a target object with higher pixel density (clearer image); whereas the image in the peripheral region P does not need to be as clear as the target object in the central region C since the human eye would not be able to perceive higher quality image in the peripheral region P anyway. The number of light signals (or pixels) in the central region C is manipulated by varying the scan rate and/or the frequency of light emission of the first light emitter 10 in the central region C. By implementing this method, with limited hardware capability, the user of the present invention can still see a first image frame F1 with expanded FOV without experiencing pixel density degradation when viewing a virtual target object.

Reference FIGS. 1-4, under normal condition (when the scan rate is at the default rate), the first light emitter 10 and the first light direction modifier 100 may be capable of forming a first image frame F1 consisted of a default resolution (e.g., 1280×720 pixels) within a first spatial range SR1 (e.g., 40 degrees in the horizontal or 22.5 degrees in the vertical direction). It is worth mentioning that the spatial range mentioned in the present discloser represent a range of in both first coordinate component and the second coordinate component, which may be expressed with two coordinates. In the present embodiment, the first spatial range SR1 correspond to the FOV of the first eye 50. In order to compensate for pixel density degradation when expanding FOV (e.g., expanding the spatial range from 40 degrees in the horizontal direction to 60 degrees), the first image frame F1 is divided into a peripheral region P and a central region C. The central region C of the image frame will be provided with higher pixel density (more number of light signals in a unit area) relative to the peripheral region P. As an example, the central region C in both coordinate components may be set as 10 degrees of the FOV in both coordinate components; the peripheral region Ps on both sides may be set to be 15 degrees of the FOV.

The following describes the method for increasing the number of light signals (or pixels) in the central region C by varying the frequency of light emission of the first light emitter 10 in the central region C. The image information within the central region C is produced with higher projection frequency (relative to a default frequency, e.g., 10 ns/pixel) of the first light emitter 10 to obtain higher number of light signals, which translate to higher resolution. The image information within the peripheral regions P can be produced with the default projection frequency (e.g., 40 ns/pixel) of the first light emitter. As a result, the pixel density of the central region C and the peripheral region P in the first image frame F1 is not uniform.

The following describes varying the number of light signals (or pixels) in the central region C by manipulating the scan rate of the first light emitter 10 in the central region C. Specifically, the first coordinate component and the second coordinate component of the light direction of the first light signals 1000 are respectively varied at the first scan rate and a second scan rate with respect to time within the first spatial range SR1 for displaying the first image frame F1. In some embodiments, either the first scan rate or the second scan rate can be non-constant. In some other embodiments, both the first scan rate and the second scan rate can be non-constant. As an example, the scan rate of the second coordinate component of the MEMS mirror can be decreased while traveling through the central region C of the first image frame F1, and the projection frequency of light emitter is kept the same, such that a higher density of pixels or higher number of light signals can be projected in the central region C within a period of time (with reference to FIG. 2).

Figure 3:
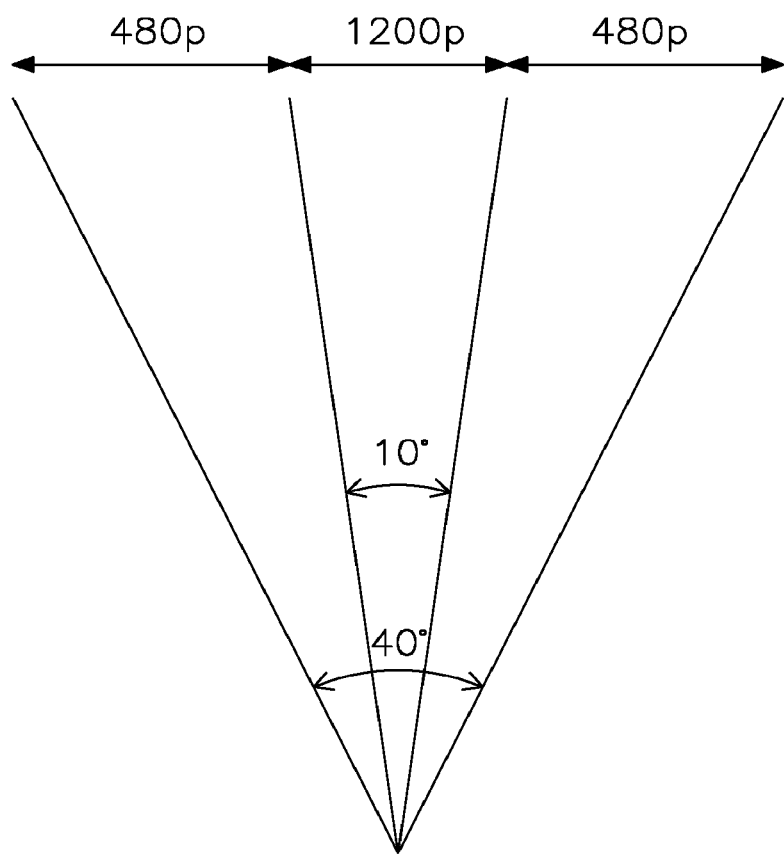
FIG. 3 is a schematic view of operation of the virtual image display system in accordance to the first embodiment of the present invention.

With reference to FIGS. 3, the following example demonstrates one specific example for the embodiment of varying the scan rate of the MEMS minor in one coordinate component (e.g., vertical direction):

The total FOV in the vertical direction is =40 degrees; the central region C is set to be 10 degrees of the central region C; the target visual acuity (VA) is 2.0 The total number of pixels required for VA2.0 in the central region C is:

60px2×10=1200 pixels (which is approximately 4 time of the original number of pixels for VA=0.5)

where 60 is the number of pixels in 1 degree of FOV required for VA=1.0

For the rest of the FOV (peripheral FOV), the density of pixels remains the same as original. The total number of pixels in the peripheral FOV is:

1280×30/40=960 pixels

VA=960/30/60=0.53

The scan rate of the MEMS mirror of the other coordinate component (e.g., horizontal direction) can also be modified to increase the number of first light signals 1000 per cross-section area. As an example, the scan rate of the other coordinate component of the MEMS minor can be decreased by ½ to increase the number pixels from, for example, 720 pixels to 1440 pixels.

Figure 4:
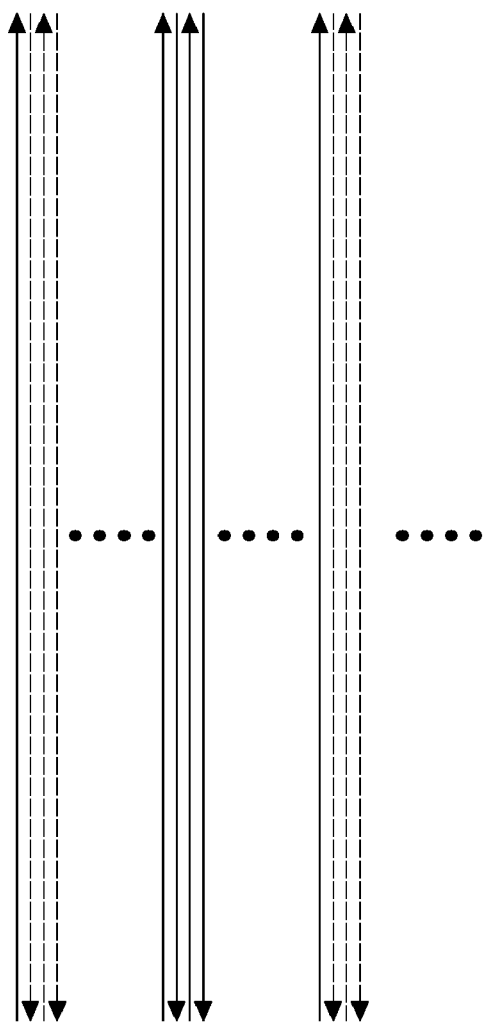
FIG. 4 is a schematic view of operation of the virtual image display system in accordance to the first embodiment of the present invention.
Figure 4:
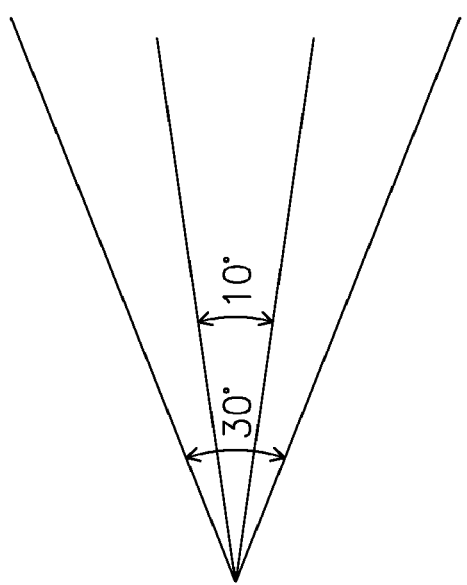

With reference to FIG. 4, the following discloses another method for changing the pixel density or resolution of the first image frame F1 in one direction without changing the scan rate. The number of pixels in the peripheral FOV can be decreased by only emitting light signal at only certain vertical positions (e.g., stop light emission for some rows of the image frame in the vertical component). The following example demonstrates one possible embodiment of decreasing the turning rate of the MEMS minor by ¼, at a constant speed in the vertical direction, to increase the vertical pixel density/resolution:

The total FOV in the vertical direction is =30 degrees; the central region C is set to be 10 degrees of the total FOV; the target VA is 2.0.

The total number of pixels required for VA2.0 in the central FOV is:

60×2×10=1200 pixels (versus the original 320 pixels for VA0.5, which is approximately 4 times of the original density)

This means for every 10 degrees of FOV, it must include 1200 pixels.

In case of the scan rate of the MEMS minor in the vertical direction needs to be constant, each peripheral FOV will also contain 1200 vertical pixels (or 1200 lines of 1280×1 pixels). If the light emitter only projects light signal for every 4 lines, the total of line projected in the peripheral region P is:

1200/4=300 lines; therefore,

VA=(300/10)160=0.5

In order to achieve 1200 lines per 10 degrees, the scan rate of the MEMS mirror in the vertical direction needs to be slower than the original scan rate for VA 0.5.

In the central region C, the light emitter emits light signal while moving in both positive and negative directions. On the other hand, the light emitter only emits light signal while moving in either positive or negative direction in the peripheral region P.

Figure 5A:
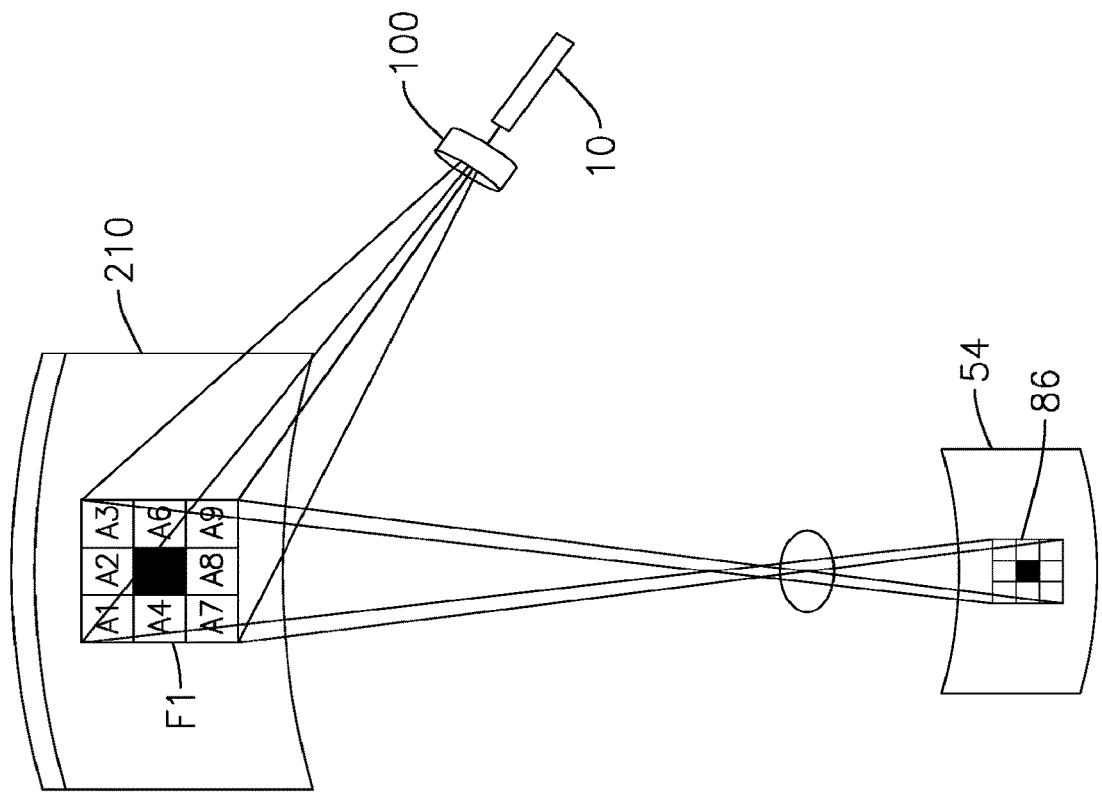
FIG. 5a is a schematic view of operation of the virtual image display system in accordance to the first embodiment of the present invention.
Figure 5A:
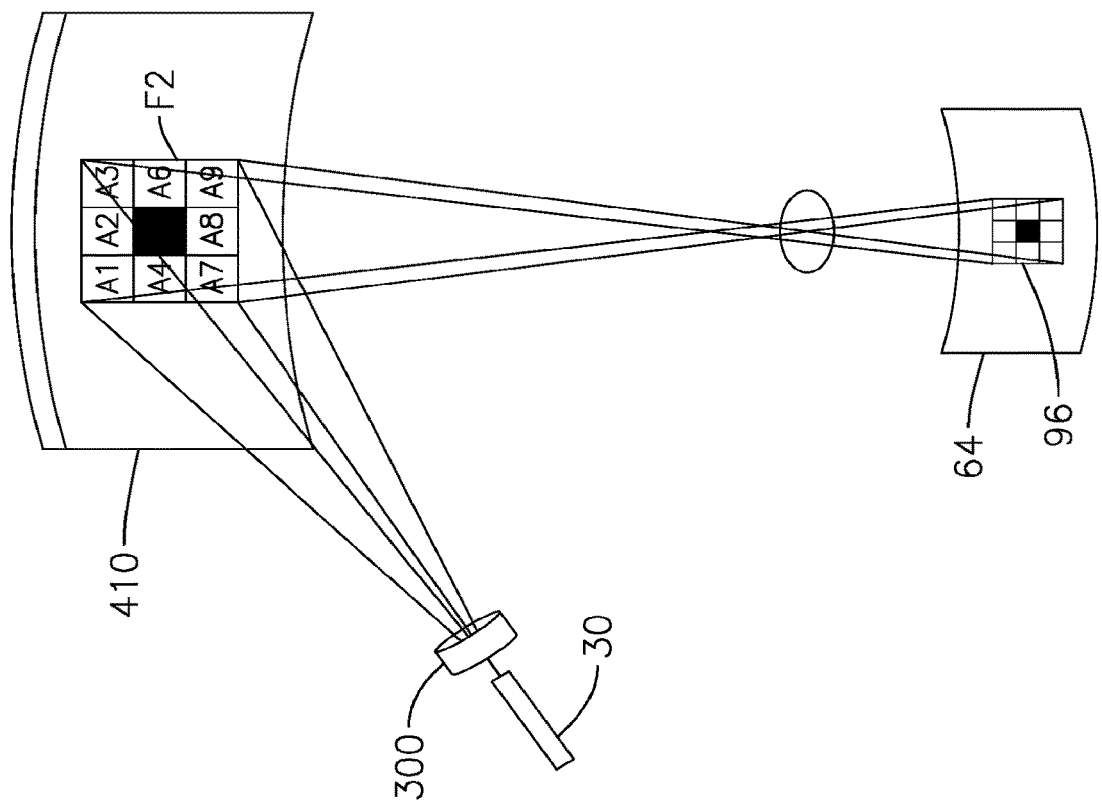
Figure 5B:
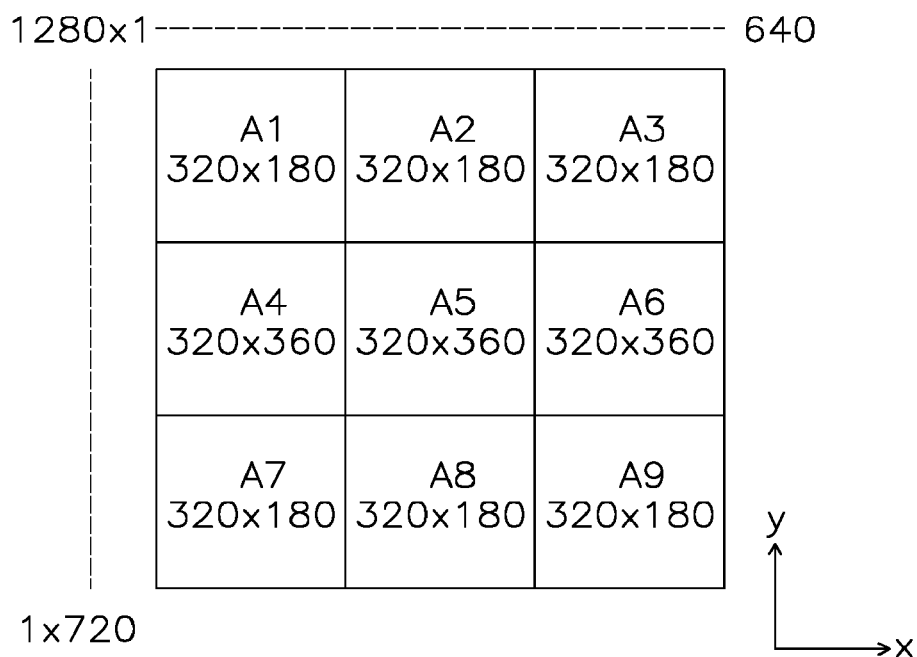
FIG. 5b is a schematic view of operation of the virtual image display system in accordance to the first embodiment of the present invention.

Further with reference to FIGS. 5a and 5b the central region C and the peripheral region P of the first image frame F1 of another embodiment is shown. The central region C is represented by area A5; whereas the peripheral region P is represented by the combination of areas A1, A2, A3, A4, A6, A7, A8, and A9. During the formation of the first image frame F1, the first light direction modifier 100 continuously rotates and changes the projection direction of the first light emitter 10 to produce the first image frame F1 in a row-by-row or column-by-column manner Particularly, the first light emitter 10 produces the first image frame F1 by projecting one pixel of image at a time; the first light direction modifier 100 then alters the direction of the first light signals 1000 to produce another pixel of image at a new location. The new location is oftentimes horizontally or vertically right next to the previous pixel of image. Therefore, after a period of time, the first light emitter 10 produces a row of pixel images or a column of pixel images (e.g., 1280×1 or 1×720). The first light direction modifier 100 then changes the direction of the first light signals 1000 to the next row or column and continues to produce a second row or a second column of pixel images. This process is repeated until a complete image frame is produced (e.g., completing 1280×720 pixel images).

In the current example, the pixels in area A1-A3 are completed first, follow by area A4-A6, and finally area A7-A9. As an example, the default resolution of the image frame may be 1280×720 pixel. When producing the pixels in area A1-A3, both the projection frequency of the first light emitter 10 and the scan rate of the first light direction modifier 100 in the column direction (or Y direction) remains at default value. However, when the pixels within area A4-A6 are produced, the scan rate of the first light direction modifier 100 in the column direction (or Y direction) is decrease (e.g., ½ times of the default value). Notice that the projection frequency of the first light emitter 10 only increases (e.g., 2 times of the default value) when producing pixels within area A5, so the number of light signals (pixels) in the row direction and column direction are both increased only in area A5 (e.g., 2×2 times of the default value). In another words, the number of light signals in a unit cross section area is the largest in area A5 (which means the pixel density is the highest; 4 times of the area A1-A3 and A7-A9). In area A4 and A6, only the pixel number in the column direction increases (e.g., 2 times of the default value). While producing pixels in area A7-A9, both the projection frequency of the first light emitter 10 and the scan rate of the first light direction modifier 100 in the column direction returns to the default values. As a result, area A5 (central region C) has the highest number of pixels; A4 and A6 have the second highest number of pixels; and areas A1-A3 and A7-A9 have the default number of pixels. The viewer of the first image frame F1 can see the most optical image when viewing the central area of the first image frame F1.

In summary, in the present embodiment, the first scan rate of the MEMS mirror in the first component direction (e.g., horizontal direction) and the second scan rate of the MEMS minor in the second component direction (e.g., vertical direction) are varied in accordance with the horizontal and vertical positions. While emitting image in the central region C, the projection frequency can be increased and/or the scan rate of the MEMS mirror in both the horizontal and vertical directions can be decreased such that a higher density of pixels or image information can be projected in the central region C (which in turn increases VA in the central region C) in a unit of time. The projection frequency and/or the scan rate of the MEMS minor in both directions can resume to normal in the peripheral region P.

Figure 6:
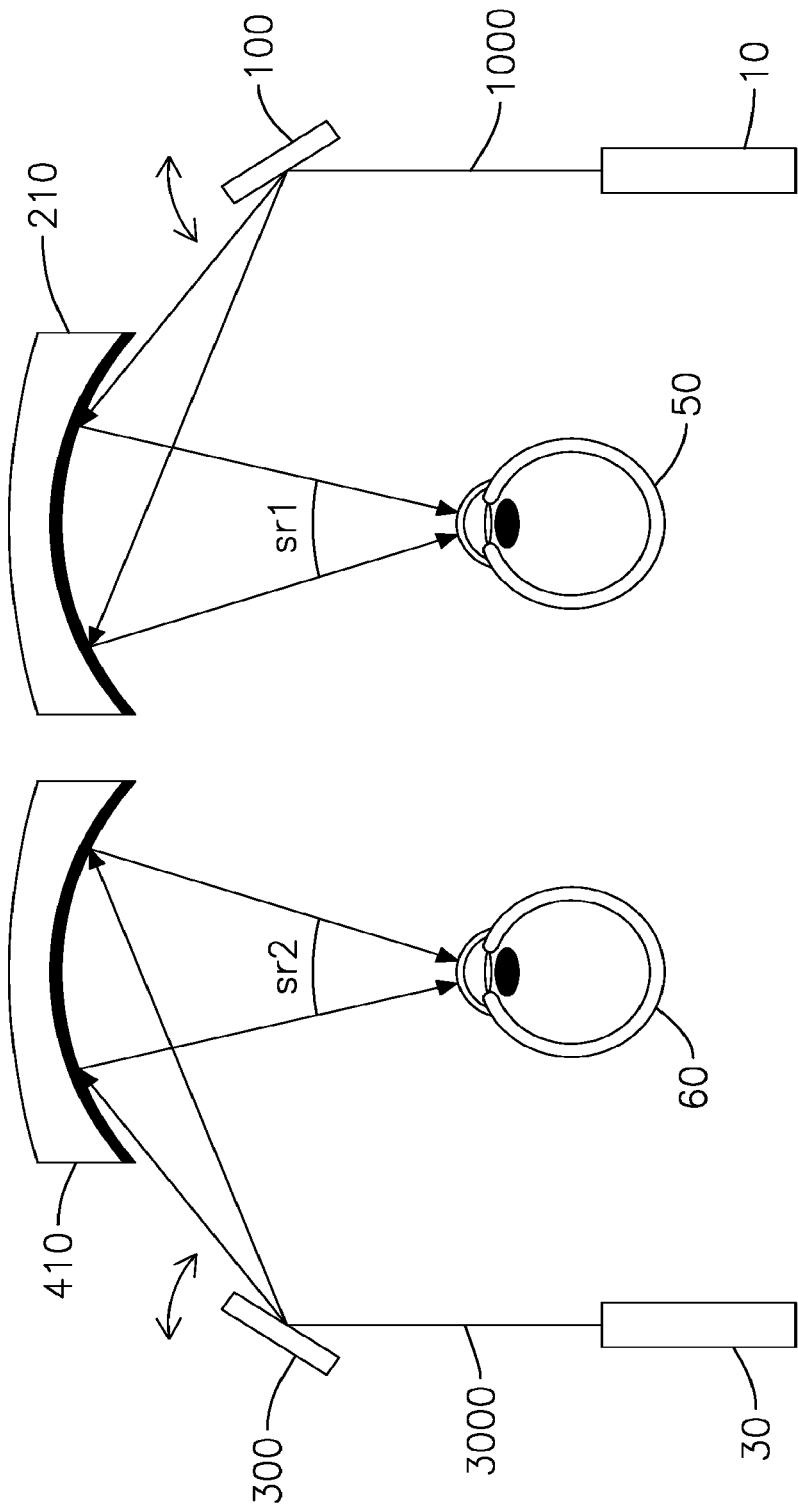
FIG. 6 is a schematic view of the head-mounted display in accordance to a variation of the embodiments of the present invention.
Figure 7:
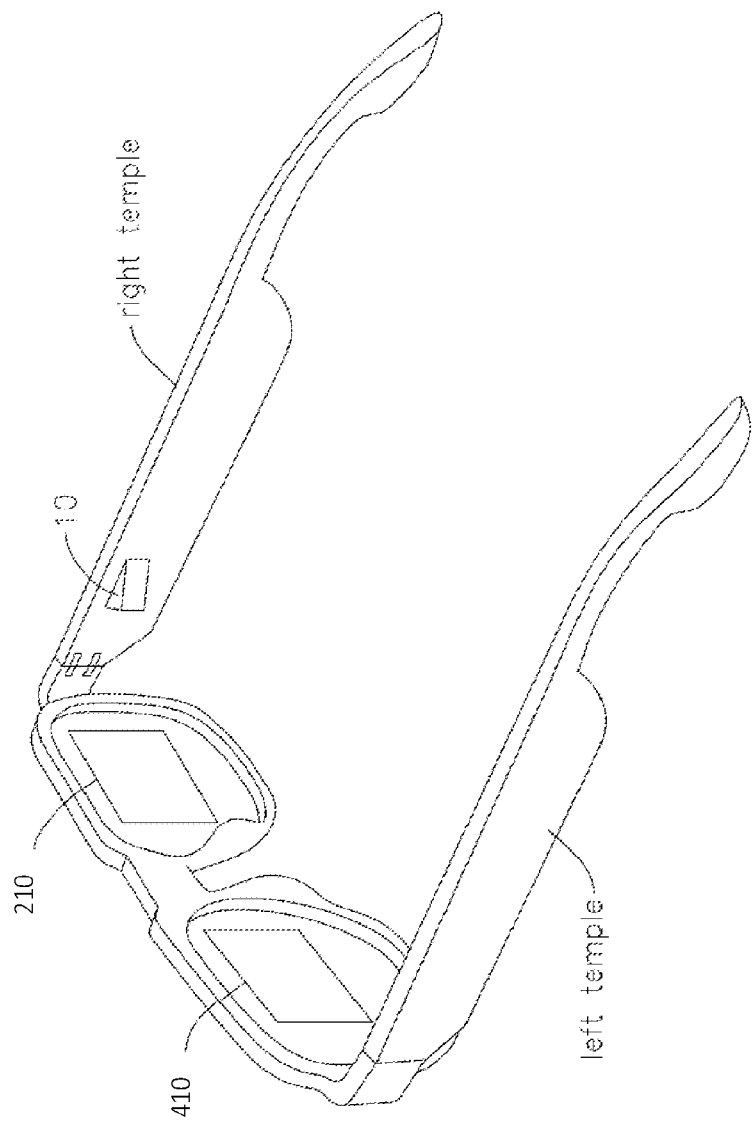
FIG. 7 is a schematic view of another head-mounted display in accordance to a variation of the embodiments of the present invention.

With reference to FIGS. 6 and 7, the present embodiment may be applied to a support structure such as a head-mounted display for virtual reality and augmented reality devices. In this case, the virtual image display system is provided to both eyes of the viewer; the virtual image display system may comprise a first combiner 210 to redirect and converge the plurality of first light signals 1000 to the viewer's first eye 50. In addition, the virtual image display system may further comprise: a second light emitter 30, which emits a plurality of second light signals 3000 to be projected into a viewer's second eye 60; a second light direction modifier 300, which varies a light direction of the plurality of second light signals 3000; a second combiner 410 to redirect and converge the plurality of second light signals 3000 to the viewer's second eye 60. The light direction of second light signals is varied at a third scan rate with respect to time within a second spatial range SR2 for displaying a second image frame F2 with a predetermined number of light signals. The third scan rate may be constant or non-constant. In this embodiment, the first light signal forming the pixel on the first image frame F1 and the corresponding second light signal forming the pixel on the second image frame F2 are perceived by the first eye 50 and second eye 60 of the viewer to form a binocular virtual image pixel at a first depth. And the first depth is related to a first angle between the first light signals 1000 and the second light signals 3000 projecting into the viewer's eyes.

Figure 8A:
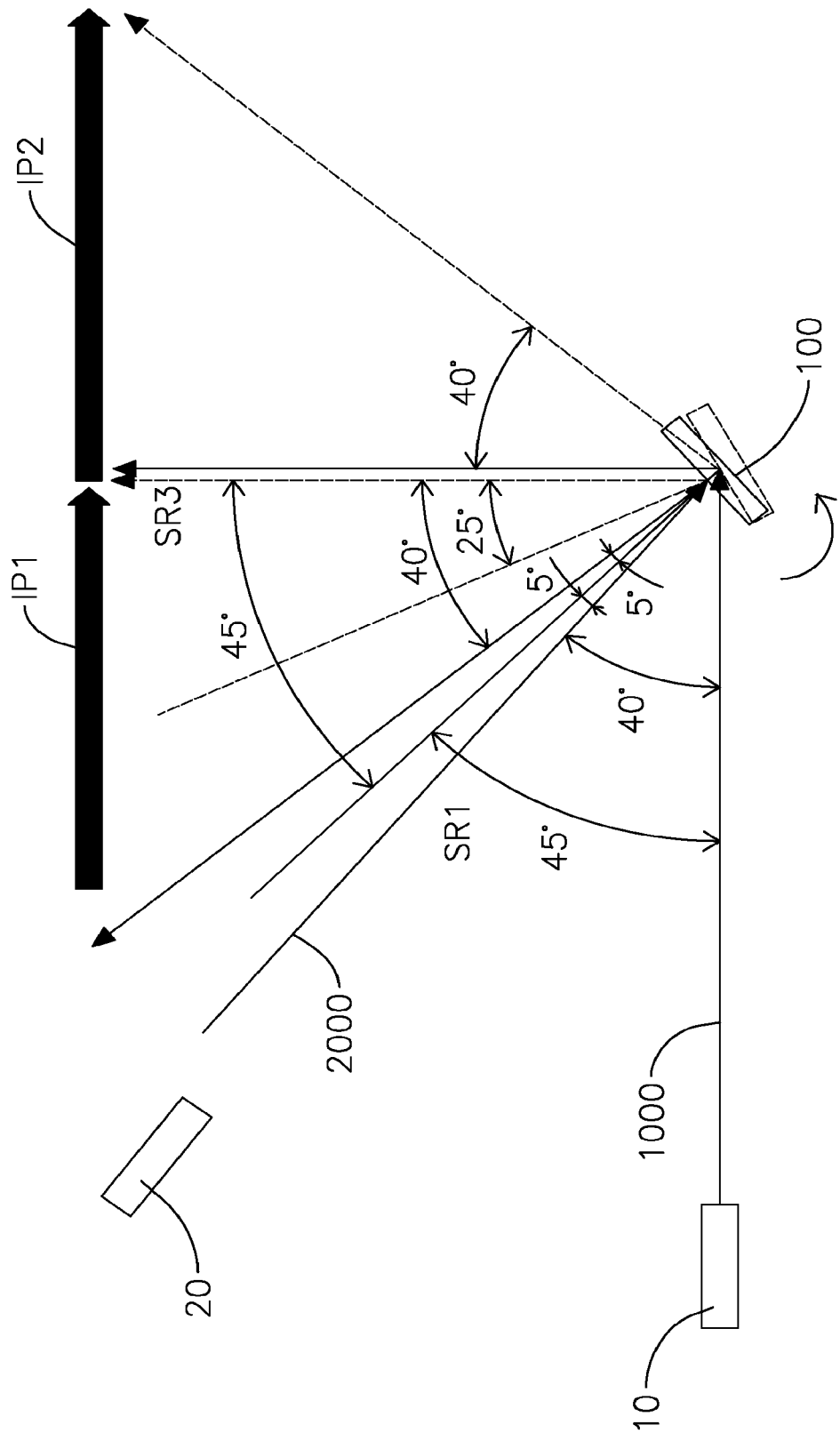
FIG. 8a is a schematic view of the virtual image display system in accordance to a second embodiment of the present invention.
Figure 8B:
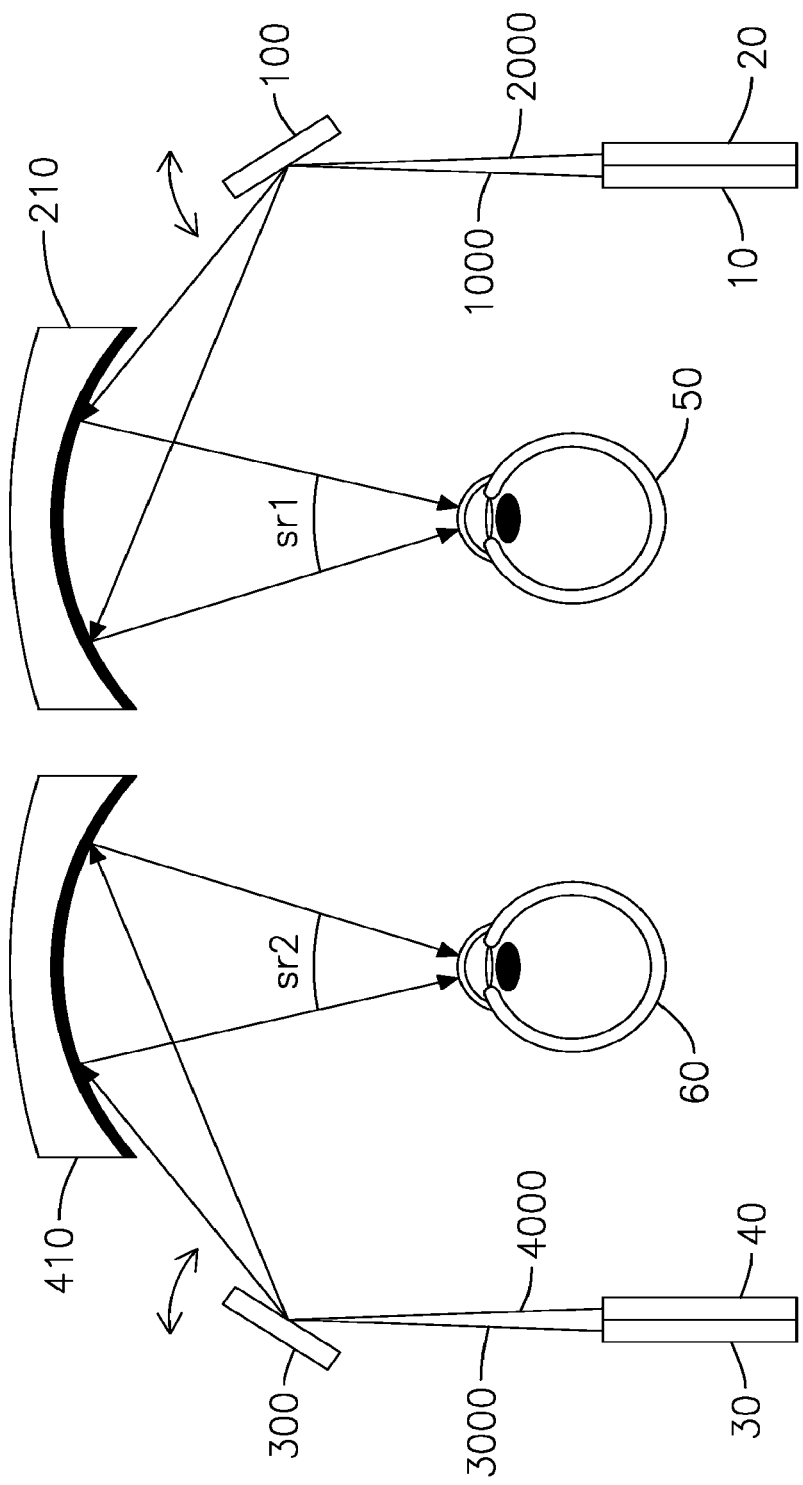
FIG. 8b is a schematic view of the virtual image display system in accordance to a variation of the second embodiment of the present invention.
Figure 9:
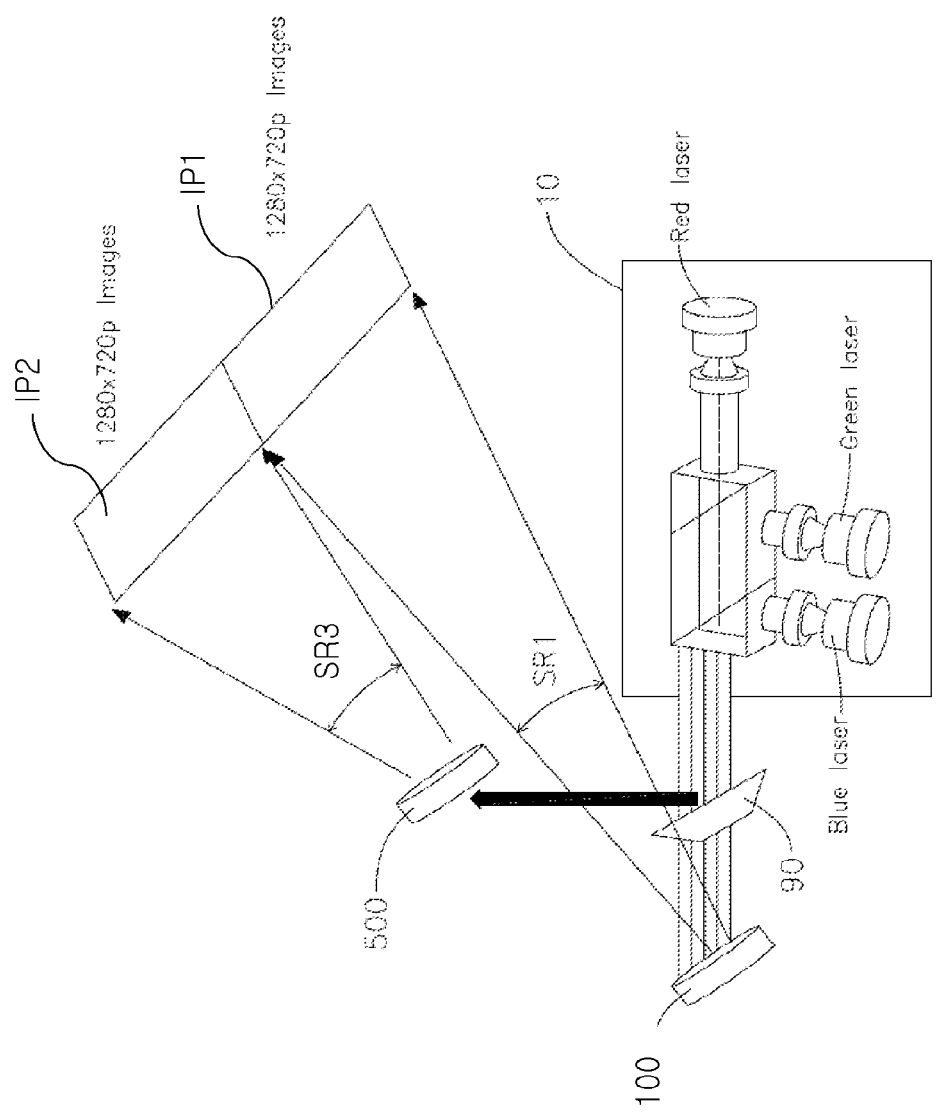
FIG. 9 is a schematic view of the virtual image display system in accordance to a third embodiment of the present invention.

The following embodiment discloses yet another MEMS based light emitting system for increasing the resolution of an image having expanded resolution and FOV. The resolution and FOV may be expanded by using multiple light emitters along with one MEMS minor as shown in FIGS. 8a and 8b. The virtual image display system may comprise a first light emitter 10 and a third light emitter 20 for respectively emitting a plurality of first light signals 1000 and a plurality of third light signals 2000 to one viewer's first eye 50 to form a first image frame F1. The first light emitter 10 and the third light emitter 20 may respectively be LBS projectors. The FOV is expanded by using one light direction modifier, as illustrated in FIG. 9. The plurality of first light signals 1000 and the plurality of third light signals 2000 from the first light emitter 10 and the third light emitter 20 are respectively projected on the first light direction modifier 100. As an example, arbitrarily, the magnitude of the maximum angle between the plurality of first light signals 1000 and a plurality of third light signals 2000 reflected by the first light direction modifier 100 may be set as two times of the maximum scanning angle (which is the maximum spatial range or maximum angle that the light direction modifier is able to turn) of the first light direction modifier. The first light direction modifier 100 varies a light direction of the plurality of first light signals 1000 and the plurality of third light signals 2000 concurrently with respect to time to form the first image frame F1 consisting of a predetermined number of light signals (e.g., 2560×720 pixels). The light direction of the plurality of first light signals 1000 is varied within a first spatial range SR1 at a first scan rate, the light direction of the plurality of third light signals 2000 is varied within a third spatial range at the first scan rate as well. In the present embodiment, the first spatial range SR1 is equal to the third spatial range SR3, which is the maximum spatial range or maximum angle that the first light direction modifier 100 is able to turn. As a result, the net scanning angle is substantially the sum of the first spatial range SR1 and the third spatial range SR3.

The first image frame F1 comprises a first image portion IP1 and a second image portion IP2. The content of the first image portion IP1 is different from a content of the second image portion IP2. During the course of the rotation of the first light direction modifier, the first light direction modifier 100 varies the light direction of the plurality of first light signals 1000 with respect to time to form the first image portion IP1; the first image portion IP1 has a first number of light signals. At the same moment, the first light direction modifier 100 varies the light direction of the plurality of third light signals 2000 with respect to time to form the second image portion IP2; the second image portion IP2 has a second number of light signals. The first image portion IP1 and the second image portion IP2 are formed concurrently. The first image portion IP1 and the second image portion IP2 represent different portions of the first image frame F1. The predetermined number of light signals (number of pixels of the first image frame F1) is generally equal to a sum of the first number of light signals (or pixels) and the second number of light signals (or pixels). However, in some embodiments, the first image portion IP1 may partially overlap with the second image portion IP2; as a result, the number of light signals (or pixels) of the first image frame F1 may be less than a sum of the first number of pixels and the second number of pixels.

As an example (with reference to FIG. 8a), at the beginning of the operation, the first light direction modifier 100 may be positioned at an angle which the incidence angle of the plurality of first light signals 1000 is 45 degrees and the incidence angle of the plurality of third light signals 2000 is 5 degrees. The light direction modifier turns from side to side to its maximum scanning angle (the maximum spatial range or maximum angle that the light direction modifier is able to turn) at the end positions on both sides to complete a scanning motion in a direction of a first coordinate (e.g., horizontal coordinate). As shown in FIG. 8a, and as an example, the incidence angle of the plurality of first light signals 1000 is 65 degrees and the incidence angle of the plurality of third light signals 2000 is 25 degrees when the light direction modifier turns to the maximum angle of rotation. As shown in this embodiment, each of the light emitter projects a portion of the first image frame F1 (i.e., the first image portion IP1 and the second image portion IP2) so the combination of the images projected by the first light emitter 10 and the third light emitter 20 forms the first image frame F1. In the example provided herein, the total net scanning angle is doubled; as a result, the FOV is expanded two times relative to the original FOV. The resolution of the image is also increased. Additionally, the number of pixels per degree of angle is maintained.

Notice that during the formation of the first image frame F1, the first light direction modifier 100 may be rotating in a first coordinate plane or a second coordinate plane with respect to an axis of rotation. The rotation of the first light direction modifier 100 causes the light direction of the plurality of first light signals 1000 and the plurality of third light signals 2000 to change in first coordinate (e.g., vertical coordinate) or second coordinate (e.g., horizontal coordinate) depending on the setting. In the present embodiment, each of the first spatial range SR1 and the third spatial range SR3 comprises a first coordinate component and a second coordinate component. According to the present embodiment, the first light direction modifier 100 concurrently varies the first coordinate components of the plurality of first light signals 1000 and the plurality of third light signals 2000 with respect to time, or the first light direction modifier 100 concurrently varies the second coordinate components of the plurality of first light signals 1000 and the plurality of third light signals 2000 with respect to time; thereby, the first image portion IP1 and the second image portion IP2 are projected concurrently to form a complete first image frame F1. With reference to FIG. 9 again, notice that the first spatial range SR1 may abut on the third spatial range on either the first coordinate component or the second coordinate component (which means the IP1 and IP2 may be abutting with each other or in proximity with each other in vertical direction or horizontal direction). However, as mentioned earlier, in some cases, the first image portion IP1 and the second image portion IP2 may overlap, causing the first spatial range SR1 to overlap with the third spatial range for image stitching on either the first coordinate component or the second coordinate component.

According to a variation of the present embodiment, The first image frame F1 may also be divided into a peripheral region P and a central region C. The central region C of the first image frame F1 will be provided with higher number of light signals per cross-section area (higher pixel density) relative to the peripheral region P. To achieve different number of light signals per cross-section area, the scan rate may be non-constant, similar to the previous embodiment. According to another variation of the present embodiment, the first coordinate component and the second coordinate component of the light direction of first light signals 1000 and third light signals 2000 are respectively varied at the first scan rate and a second scan rate with respect to time within the first spatial range SR1 and the third spatial range SR3 with a non-constant second scan rate, similar to the previous embodiment, to adjust a number of light signals per cross-section area in a predetermined region in the first image frame F1.

In yet another variation of the present embodiment, similar to the previous embodiment, either the first light emitter 10 emits the plurality of first light signals 1000 as light pulses at a varying frequency or the third light emitter 20 emits plurality of the third light signals 2000 as light pulses at a varying frequency to adjust a number of light signals per cross-section area of a predetermined region in the first image frame F1.

Similar to the previous embodiment, the present embodiment may be applied to a support structure such as a head-mounted display for virtual reality and augmented reality devices (as shown in FIG. 8*b*). In this case, the virtual image display system is provided to both eyes of the viewer; the virtual image display system may comprise a first combiner 210 to redirect and converge the plurality of first light signals 1000 and third light signals 2000 to the viewer's first eye 50. In addition, the virtual image display system may further comprise: the first light emitter 10 to emit the plurality of first light signals 1000 to be projected into the viewer's first eye 50; the third light emitter 20 to emit the plurality of third light signals 2000 to be projected into the viewer's first eye 50; the first light direction modifier 100 for changing the direction of light signals emitted by the first light emitter 10 and the third light emitter 20, a second light emitter 30 to emit a plurality of second light signals 3000 to be projected into a viewer's second eye 60; a fourth light emitter 40 to emit a plurality of fourth light signals 4000 to be projected into the viewer's second eye 60. In the present case, in addition to the first light direction modifier, a second light direction modifier 300 is provided to concurrently and respectively vary a light direction of the plurality of second light signals 3000 within a second spatial range SR2 and a light direction of the plurality of fourth light signals within a fourth spatial range at a third scan rate for displaying a second image frame F2 with a predetermined number of light; a second combiner 410 to redirect and converge the plurality of second light signals 3000 and fourth light signals 4000 to the viewer's second eye 60. With virtual image display system being provided to both eyes of the viewer, the viewer is able to perceive a first light signal or a third light signal forming a pixel on the first image frame F1 and a corresponding second light signal or fourth light signal forming a pixel on the second image frame F2 display a binocular virtual image pixel at a first depth. The first depth is related to a first angle between the first light signal or the third light signal and the corresponding second light signal or fourth light signal projecting into the viewer's first eye 50.

In the following embodiment, another MEMS base light emitting system for overcoming the previously mentioned limitations in in the prior art is disclosed. In this embodiment, multiple MEMS mirrors along with a one light emitter is implemented. As shown in FIG. 9, the virtual image display system may comprise a first light emitter 10 (e.g., a Laser Beam Splitting projector/LBS projector), a first light direction modifier 100, a third light direction modifier 500 and a first light switch 90.

The first light switch 90 is a type of beam splitter which can dynamically control the amount of light leaving the beam splitter in different directions. A typical beam splitter is able to split a light beam into two or more components; each of the components travels through the beam splitter in different path and leave the beam splitter in different directions. The first light switch 90 described herein may be refer to a dynamic beam splitter which can dynamically control the amplitude of the components leaving the beam splitter in each direction. As an example, the light switch in accordance with the present invention may comprise liquid crystal to block a first polarity of the light beam while allowing second polarity of light to go through. In another period of time, the phase of the liquid crystal may be changed to allow the first polarity of the light beam to pass through while blocking the second polarity of the light beam. Notice that the light beam may have a uniform polarity so the light beam can be completely blocked or allowed to pass depending on the phase of the liquid crystal in the light switch. The operation of the first light switch 90 may be controlled by electrical voltage or electromagnetic field.

In the present embodiment, the first light emitter 10 is used for emitting a plurality of first light signals. The first light switch 90 is capable of periodically redirect a first portion of the first light signals 1000 to a first light direction modifier 100 during the first time period and then redirect a second portion of the first light signals 1000 to a third light direction modifier 500 during the second time period. The first light direction modifier 100 and a third light direction modifier 500 are implemented for varying a light direction of the plurality of first light signals 1000 with respect to time to form a first image frame F1 consisting of a predetermined number of light signals (or pixels). More specifically, the first light direction modifier 100 varies a light direction of the first portion of first light signals 1000 at a first scan rate within a first spatial range SR1 during the first time period; and the third light direction modifier 500 varies a light direction of the second portion of first light signals 1000 at a fifth scan rate within a third spatial range SR3 during the second time period for displaying a first image frame F1 with a predetermined number of light signals. As an example, the first light direction modifier 100 and a third light direction modifier 500 may respectively be MEMS minors. And the first light switch 90 is controlled by electronic voltage.

As illustrated in FIG. 9, the first light switch 90 is inserted in-line between the first light emitter 10 and the two light direction modifiers. The first light switch 90 can be switched between a non-transparent mode and a transparent mode for the two light direction modifiers respectively to enable first light signals 1000 to pass through, or to reflect first light signals 1000 to one of the two light direction modifiers. As an example, the first light switch 90 may be controlled by application-specific integrated circuit (ASIC) to direct a the first portion of the first light signals 1000 to the first light direction modifier 100 while directing (or blocking) the second portion of the first light signals 1000 to the third light direction modifier 500.

The first light emitter 10 produces the first image frame F1 consisting of a predetermined number of light signals by dividing the first image frame F1 into a plurality of image portions, and then projects the image portions respectively and successively. For example, a 2560×720 pixels first image frame F1 is divided into two 1280×720 image portions; namely, a first image portion IP1 and a second image portion IP2. In the present embodiment, the first portion of first light signals 1000 forms the first image portion IP1 of the first image frame F1; and the first image portion IP1 has a first number of light signals (e.g., 1280×720 light signals). The second portion of first light signals 1000 forms the second image portion IP2 of the first image frame F1 and the second image portion IP2 has a second number of light signals (e.g., 1280×720 light signals). During the formation of the first image frame F1, the plurality of first light signals 1000 corresponding to the first row of the first image portion IP1 (1280×1 pixels) is allowed to pass through the first light switch 90 to be reflected by the first light direction modifier. After finishing emitting the first row of the first image portion IP1, the first light switch 90 permits the first row of the second image portion IP2 (also 1280×1 pixels) to be reflected by the third light direction modifier 500 to produce the first row of the second image portion IP2. Meanwhile the first light direction modifier 100 returns to a starting position. When the third light direction modifier 500 finishes emitting the first row of the second image portion IP2, the first row of the first image frame F1 is rendered (total of 2560×1 pixels); and the first light switch 90 is switched back to a transparent mode for the first light direction modifier 100 to enable emitting the second row of the first image portion IP1. The first row of the first image frame F1 is formed successively by the first light direction modifier 100 and the third light direction modifier 500. The third light direction modifier 500 then returns to a start position for the next scan. Thus, the first light switch 90 is controlled to switch between the transparent mode to the non-transparent mode for emitting the first image frame F1 in a row-by-row (or similarly, column-by-column fashion) fashion until the complete first image frame F1 is rendered (2560 pixels by 720 lines).

Notice that during the formation of the first image frame F1, the first light direction modifier 100 and the third light direction modifier 500 may be rotating in a first coordinate component or the second coordinate component (e.g., horizontal and vertical component) with respect to their respective axis of rotation. For example, the rotation of the first light direction modifier 100 and the third light direction modifier 500 causes the light direction of the plurality of first light signals 1000 to change in vertical coordinate or the horizontal coordinate, depending on the setting. The first light direction modifier 100 changes the light direction of the plurality of first light signals 1000 within a first spatial range SR1, the third light direction modifier 500 changes the light direction of the plurality of first light signals 1000 within a third spatial range SR3. The first spatial range SR1 and third spatial range SR3 is related to the rotation angle of the first light direction modifier 100 and the third light direction modifier 500, respectively. Each of the first spatial range SR1 and the third spatial range SR3 may be represented by the first coordinate component and the second coordinate component.

In summary, according to the present embodiment, the first light direction modifier 100 and the third light direction modifier 500 successively vary the first coordinate component with respect to time, or the first light direction modifier 100 and the third light direction modifier 500 successively vary the second coordinate component with respect to time; thereby, the first image portion IP1 and the second image portion IP2 are projected successively in a row-by-row manner or column-by-column manner to form a complete first image frame F1.

It is also worth mentioning that the content of the first image portion IP1 is different from a content of the second image portion IP2, which means the first image portion IP1 and the second image portion IP2 represent different portions of the first image frame F1. The first image portion IP1 has a first number of light signals, the second image portion IP2 has a second number of light signals. When the first spatial range SR1 abuts on the third spatial range on either the first coordinate component or the second coordinate component (which means the IP1 and IP2 may be abutting with each other or in proximity with each other in vertical direction or horizontal direction), the predetermined number of light signals (number of pixels of the first image frame F1) is generally equal to a sum of the first number of light signals and the second number of light signals. However, in some embodiments, when the first spatial range SR1 partially overlaps with the third spatial range for image stitching on either the first coordinate component or the second coordinate component, the number of pixels of the first image frame F1 may be less than a sum of the first number of light signals and the second number of light signals. In the example provided herein, the total net scanning angle is increased; as a result, the FOV is expanded relative to the original FOV. In the meantime, the resolution of the image is also increased. More importantly, the number of pixels per degree of angle (or number of light signals per cross-section area) is maintained.

According to a variation of the present embodiment, the first image frame F1 may also be divided into a peripheral region P and a central region C. The central region C of the first image frame F1 will be provided with higher number of light signals per cross-section area (higher pixel density) relative to the peripheral region P. To achieve different number of light signals per cross-section area, the first scan rate (a scan rate with respect to an axis of rotation) or the fifth scan rate may be non-constant. Particularly, the first coordinate component of the light direction of first light signals 1000 is varied at the first scan rate and a fifth scan rate with respect to time within the first spatial range SR1 and the third spatial range SR3, the second coordinate component of the light direction of first light signals 1000 is varied at the second scan rate and a sixth scan rate with respect to time within the first spatial range SR1 and the third spatial range SR3, collectively for displaying the first image frame F1 with the predetermined number of light signals, and the second scan rate or the sixth scan rate is non-constant. The first light direction modifier 100 may also change either the first scan rate or the fifth scan rate to adjust a number of light signals per cross-section area in a predetermined region in the first image frame F1.

In yet another variation of the present embodiment, similar to the previous embodiment, the first light emitter 10 emits the plurality of first light signals 1000 as light pulses at a varying frequency during the first time period or the second time period to adjust a number of light signals per cross-section area of a predetermined region in the first image frame F1. Furthermore, when applying the current embodiment to the head-mounted display for virtual reality and augmented reality devices, the head-mounted display may comprise a second set of virtual image display system for producing a second image frame F2 to another eye of the viewer.

Figure 10:
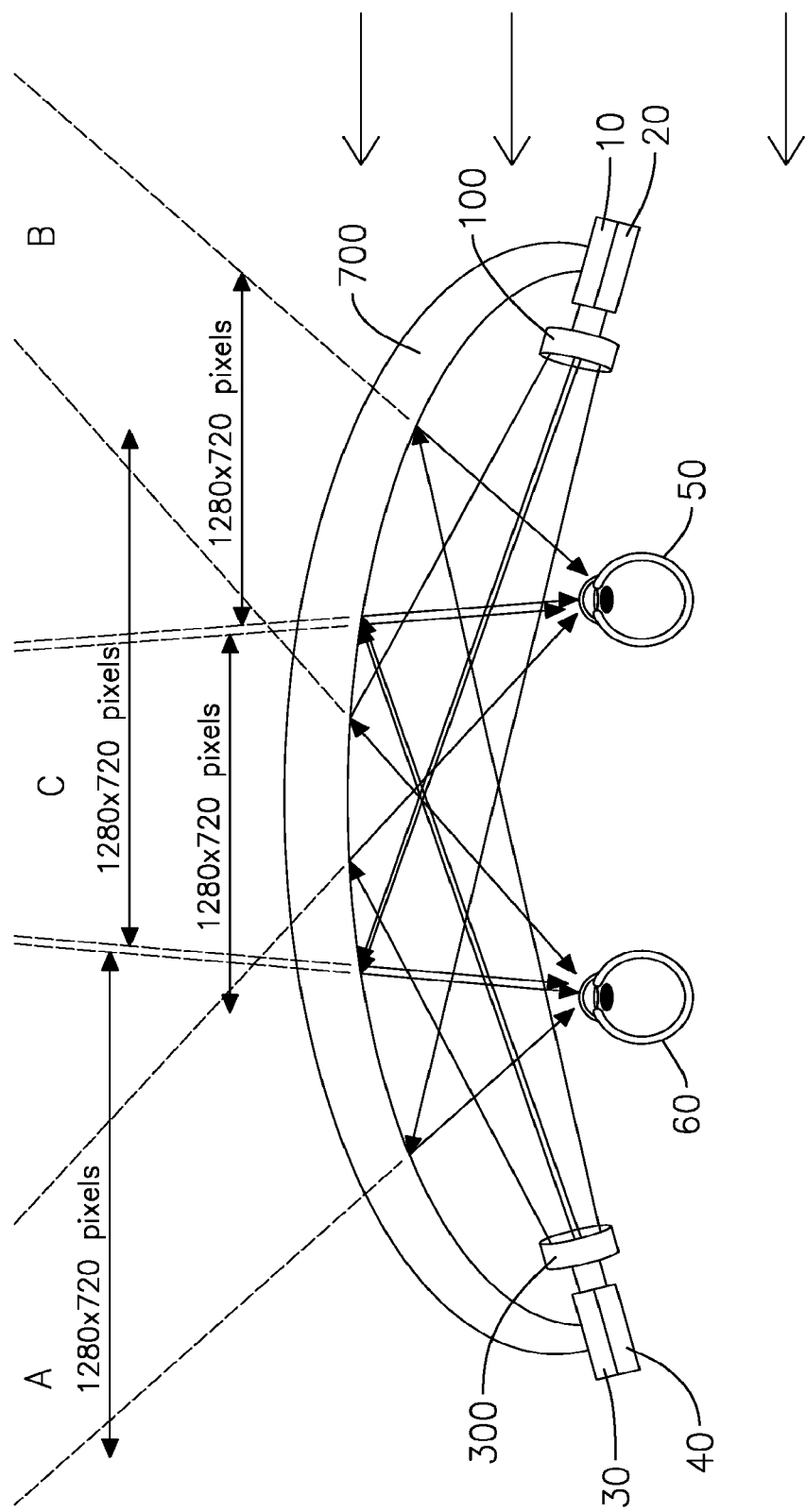
FIG. 10 is a schematic view of the virtual image display system in accordance to a variation of the embodiments of the present invention.

With reference to, in a variation embodiment of any one of the previous embodiments, the head-mounted display may comprise an integrated combiner 700 for respectively reflecting light signals to both eyes of the viewer, replacing the first combiner 210 and the second combiner 410. The head-mounted display may comprise a pair of virtual image display system for both eyes. The virtual image display system may be anyone of the virtual image display systems readily described above. The virtual image display system on the left (e.g., the second light emitter 30 or the fourth light emitter 40) may be responsible for producing an image frame to the second eye 60 (e.g., left eye), and the virtual image display system on the right (e.g., the first light emitter 10 or the third light emitter 20) may be responsible for producing the image frame to the first eye 50 (e.g., right eye). However, in one instance (with reference to FIG. 10), the virtual image display system on the left (e.g., the second light emitter 30 or the fourth light emitter 40) may be responsible for producing an image frame to the first eye 50 (e.g., right eye), and the virtual image display system on the right (e.g., the first light emitter 10 or the third light emitter 20) may be responsible for producing the image frame to the second eye 60 (e.g., left eye). As shown in FIG. 10, the FOV may be larger than that of the embodiment shown in FIG. 6. As a result, the total area of FOV overlap is increased, giving the viewer larger viewing area having depth perception. The virtual image display system may have a single light emitter with one light direction modifier; a single light emitter with two light direction modifiers; or two light emitters with one light direction modifier, as described in the previous embodiments.

Figure 11:
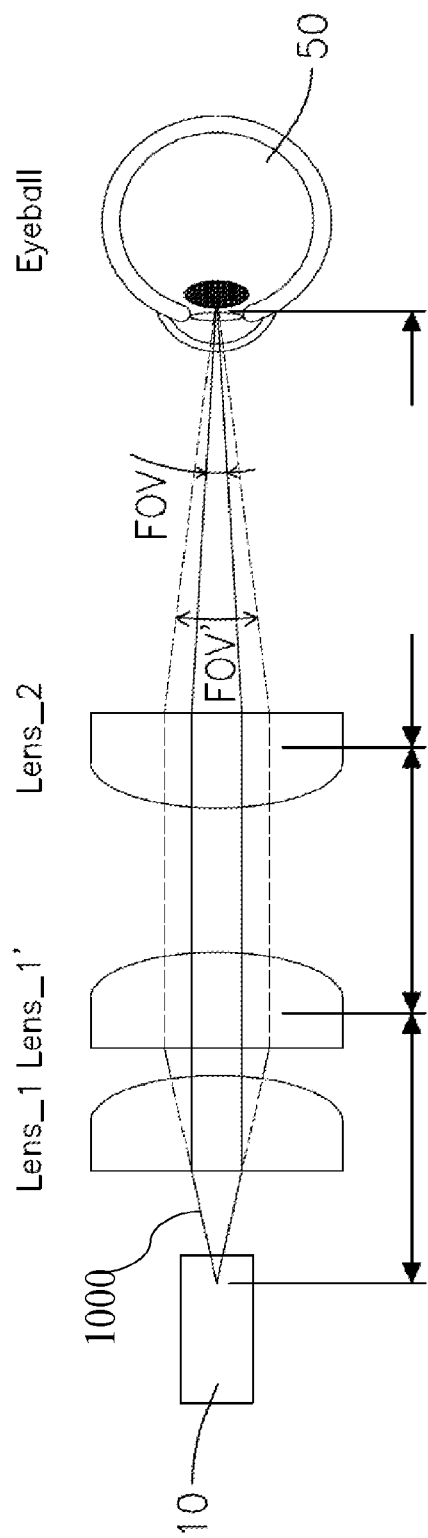
FIG. 11 is a schematic view of the optical assembly in accordance to a variation of the embodiments of the present invention.

With reference to FIG. 11 further in other variations of the present embodiment, an optical assembly may be disposed between the light emitter and the combiner mentioned above to alter an area of a predetermined cross section of a light path of the plurality of first light signals. Specifically, the optical assembly containing lens may be implemented for altering optical path of the plurality of first light signals 1000 from the first light emitter 10 to the first combiner 210 to change a projection area or a cross sectional size of each of the plurality of first light signals. For example, with reference to FIG. 10, the optical assembly comprises Lens_1 and Lens_2. Lens_1, and Lens_2 are convex lenses. A light emitter is originally placed at the focal length of Lens_1. When Lens_1 is moved to a new position shown as Lens_1', the distance between the light emitter and Lens_1 is shortened; as a result, the amount of light divergent angle from the LBS is increased. Thereby, the projection area or a cross sectional size of each of the plurality of first light signals 1000 is also increased.

Figure 12A:
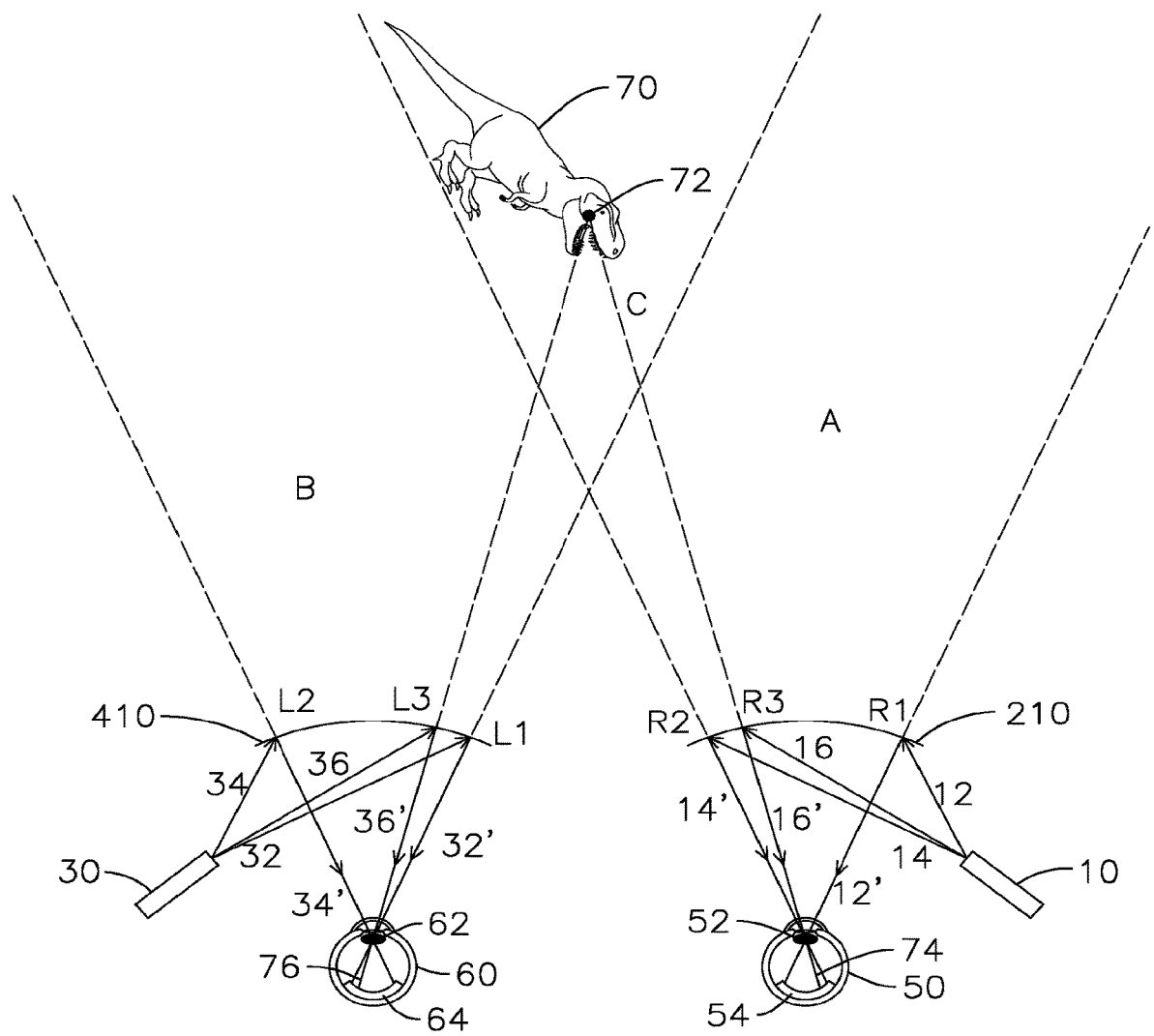
FIG. 12a is a schematic view for describing the method for displaying a binocular virtual image pixel at a first depth in accordance with the present invention.
Figure 12B:
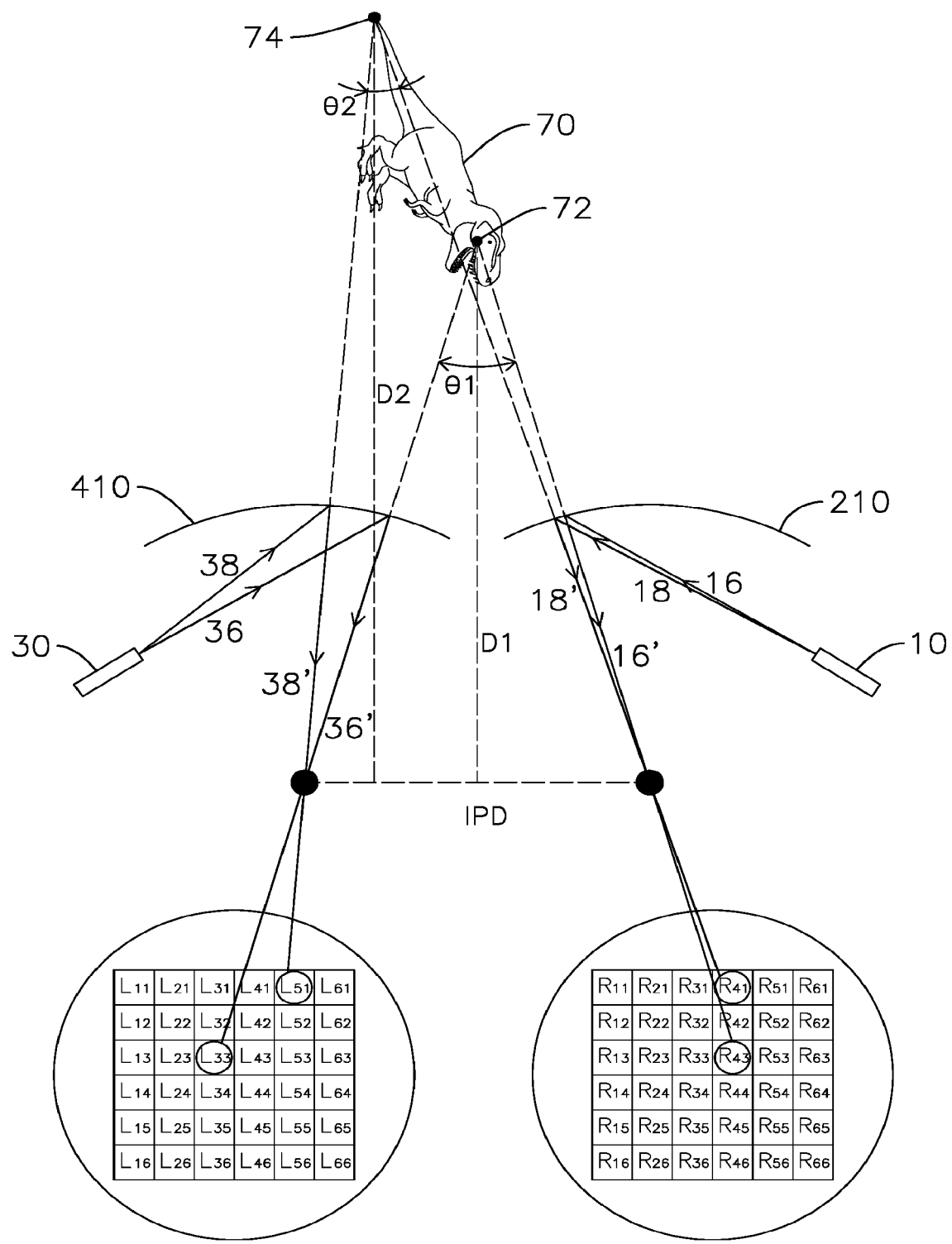
FIG. 12b is another schematic view for describing the method for displaying a binocular virtual image pixel at a first depth in accordance with the present invention.

As mentioned in the previous embodiments, the pixel in the first image frame F1 and a corresponding pixel in the second image frame F2 form a binocular virtual image pixel at a first depth which is related to a first angle between the first light signal and the second light signal projecting into the viewer's eyes. The following describes the method for displaying a binocular virtual image pixel with the first depth in detail. With reference to FIGS. 12a and 12b, upon receipt of the plurality of light signals, the viewer would perceive multiple right pixels in the first image frame F1 for the object in the area A bounded by the extensions of the redirected right light signals from the combiner. The area A is referred to as the field of view (FOV) for the right eye 50. Likewise, the multiple left light signals in the second image frame F2 are redirected by the first combiner 210, pass the center of the left pupil 62, and are eventually received by the left retina 64. Upon receipt of the redirected left light signals, the viewer would perceive multiple left pixels for the object in the area B bounded by the extensions of the redirected left light signals. The area B is referred to as the field of view (FOV) for the left eye 60. When both multiple right pixels from the first image frame F1 and left pixels from the second image frame F2 are displayed in the area C which are overlapped by area A and area B, at least one right light signal displaying one right pixel and a corresponding left light signal displaying one left pixel are fused to display a binocular virtual image pixel with a specific depth in the area C. The depth is related to an angle of the redirected right light signal and the redirected left light signal. Such angle is also referred to as a convergence angle.

As shown in FIG. 12b, the viewer perceives a virtual image of the dinosaur object 70 with multiple depths in the area C in front of the viewer. Notice that since area C is in which both eyes is able to fixate and perceive the image with depth, it may be desirable for area C to be the central region C of the FOV such that the image within area C is produced with highest pixel density. The image of the dinosaur object 70 includes a first binocular virtual image pixel 72 displayed at a first depth D1 and a second binocular virtual image pixel 74 displayed at a second depth D2. The first angle between the first redirected right light signal 162 and the corresponding first redirected left light signal 362 is θ1. The first depth D1 is related to the first angle θ1. In particular, the first depth of the first binocular virtual image pixel of the object can be determined by the first angle θ1 between the light path extensions of the first redirected right light signal and the corresponding first redirected left light signal. As a result, the first depth D1 of the first binocular virtual image pixel 72 can be calculated approximately by the following formula:

$$\operatorname{Tan}\left(\frac{\Theta}{2}\right) = \frac{IPD}{2D}$$

The distance between the right pupil 52 and the left pupil 62 is interpupillary distance (IPD) Similarly, the second angle between the second redirected right light signal 18 and the corresponding second redirected left light signal is θ2. The second depth D1 is related to the second angle θ2. In particular, the second depth D2 of the second binocular virtual image pixel of the object can be determined approximately by the second angle θ2 between the light path extensions of the second redirected right light signal and the corresponding second redirected left light signal by the same formula. Since the second binocular virtual image pixel 74 is perceived by the viewer to be further away from the viewer (i.e., with larger depth) than the first binocular virtual image pixel 72, the second angle θ2 is smaller than the first angle θ1.

Furthermore, although the redirected right light signal 162 and the corresponding redirected left light signal 362 together display a first binocular virtual image pixel 72 with the first depth D1, the redirected right light signal 162 is not a parallax of the corresponding redirected left light signal 362. Conventionally, a parallax between the image received by the right eye and the image received by the left eye is used for a viewer to perceive a 3D image with depth because the right eye sees the same object from a view angle different from that of a left eye. However, in the present invention, the right light signal and the corresponding left light signal for a binocular virtual image pixel display an image of the same view angle. Thus, the intensity of red, blue, and green (RBG) color and/or the brightness of the right light signal and the left light signal are approximately the same. In other words, the right pixel and the corresponding left pixel are approximately the same. However, in another embodiment, one or both of the right light signal and the left light signal may be modified to present some 3D effects such as shadow. In general, both the right eye and the left eye receive the image of the object from the same view angle in the present invention, rather than a parallax respectively from the right eye view angle and left eye view angle, conventionally used to generate a 3D image.

As described above, the multiple right light signals are generated by the right light signal generator, redirected by the second combiner 410, and then directly scanned onto the right retina to form a right retina image on the right retina. Likewise, the multiple left light signals are generated by left light signal generator, redirected by the first combiner 210, and then scanned onto the left retina to form a left retina image on the left retina. In an embodiment shown in FIG. 12b, a right retina image 80 contains 36 right pixels from the first image frame F1 in a 6×6 array and a left retina image 90 also contains 36 left pixels from the second image frame F2 in a 6×6 array. In another embodiment, a right retina image 80 contains 921,600 right pixels from the first image frame F1 in a 1280×720 array and a left retina image 90 also contains 921,600 left pixels from the second image frame F2 in a 1280×720 array. The object displaying system is configured to generate multiple right light signals and corresponding multiple left light signals which respectively form the right retina image on the right retina and left retina image on the left retina. As a result, the viewer perceives a virtual binocular object with specific depths in the area C because of image fusion. The first right light signal 16 from the right light signal generator 10 is received and reflected by the second combiner 410. The first redirected right light signal 162, through the right pupil 52, arrives the right retina of the viewer to display the right pixel R34. The corresponding left light signal 36 from the left light signal generator 30 is received and reflected by the first combiner 210. The first redirected light signal 362, through the left pupil 62, arrives the left retina of the viewer to display the left retina pixel L33. As a result of image fusion, a viewer perceives the virtual binocular object with multiple depths where the depths are determined by the angles of the multiple redirected right light signals and the corresponding multiple redirected left light signals for the same object. The angle between a redirected right light signal and a corresponding left light signal is determined by the relative horizontal distance of the right pixel and the left pixel. Thus, the depth of a binocular virtual image pixel is inversely correlated to the relative horizontal distance between the right pixel and the corresponding left pixel forming the binocular virtual image pixel. In other words, the deeper a binocular virtual image pixel is perceived by the viewer, the smaller the relative horizontal distance at X axis between the right pixel and left pixel forming such a binocular virtual image pixel is. For example, as shown in FIG. 12b, the second binocular virtual image pixel 74 is perceived by the viewer to have a larger depth (i.e., further away from the viewer) than the first binocular virtual image pixel 72. Thus, the horizontal distance between the second right pixel and the second left pixel is smaller than the horizontal distance between the first right pixel and the first left pixel on the retina images. Specifically, the horizontal distance between the second right pixel R41 and the second left pixel L51 forming the second binocular virtual image pixel is four-pixel long. However, the distance between the first right pixel R43 and the first left pixel L33 forming the first binocular virtual image pixel is six-pixel long.

With reference to FIGS. 12a and 12b again, a virtual object perceived by a viewer in area C includes multiple binocular virtual image pixels. To precisely describe the location of a binocular virtual image pixel in the space, each location in the space is provided a three dimensional (3D) coordinate, for example XYZ coordinate. Other 3D coordinate system can be used in another embodiment. As a result, each binocular virtual image pixel has a 3D coordinate—a horizontal direction, a vertical direction, and a depth direction. A horizontal direction (or X axis direction) is along the direction of interpupillary line. A vertical direction (or Y axis direction) is along the facial midline and perpendicular to the horizontal direction. A depth direction (or Z axis direction) is normal to the frontal plane and perpendicular to both the horizontal and vertical directions.

Although particular embodiments of the present invention have been described in detail for purposes of illustration, various modifications and enhancements may be made without departing from the spirit and scope of present discloser.

What is claimed is:
1. A virtual image display system comprising:
   a first light emitter emitting a plurality of first light signals to be projected into a viewer's first eye;
   a first light direction modifier varying a light direction of the plurality of first light signals emitted from the first light emitter;

a first combiner to redirect and converge the plurality of first light signals to the viewer's first eye;

a second light emitter emits a plurality of second light signals to be projected into a viewer's second eye;

a second light direction modifier to vary a light direction of the plurality of second light signals emitted from the second light emitter; and a second combiner to redirect and converge the plurality of second light signals to the viewer's second eye, wherein the light direction of first light signals is varied at a first scan rate with respect to time within a first spatial range for displaying a first image frame with a predetermined number of light signals and the first scan rate is configured to be non-constant, wherein each of the plurality of first light signals forms a pixel in the first image frame and a pixel density in the first image frame is configured to be not uniform, the first scan rate is decreased while rendering a central region of the first image frame, and the projection frequency of light emitter remains the same, such that the central region has the pixel density higher than that of a peripheral region of the first image frame, wherein the light direction of second light signals is varied at a third scan rate with respect to time within a second spatial range for displaying a second image frame with a predetermined number of light signals and the third scan rate is configured to be non-constant; and wherein a first light signal forming a pixel on the first image frame and a corresponding second light signal forming a pixel on the second image frame display a binocular virtual image pixel at a first depth which is related to a first angle between the first light signal and the second light signal projecting into the viewer's eyes.

2. The virtual image display system of claim 1, wherein the light direction comprises a first coordinate component and a second coordinate component, the first coordinate component and the second coordinate component of the light direction of first light signals are respectively varied at the first scan rate and a second scan rate with respect to time within the first spatial range for displaying the first image frame with the predetermined number of light signals, and the second scan rate is configured to be non-constant.

3. The virtual image display system of claim 1, wherein the first light direction modifier changes the first scan rate to adjust the pixel density of the first light signals in the first image frame.

4. The virtual image display system of claim 1, wherein the first scan rate is a swing frequency with respect to an axis of rotation.

5. The virtual image display system of claim 4, wherein the scan rate is reduced to increase a number of first light signals per cross-section area of a predetermined region in the first image frame.

6. The virtual image display system of claim 1, wherein the first light direction modifier is a two-dimensional MEMS mirror or two one-dimensional MEMS mirrors.

7. The virtual image display system of claim 1, wherein the first light emitter is a laser beam generator.

8. The virtual image display system of claim 1, further comprising a first combiner to redirect and converge the plurality of first light signals to the viewer's first eye.

9. The virtual image display system of claim 8, further comprising a first optical assembly disposed between the first light emitter and the first combiner to alter an area of a predetermined cross section of a light path of the plurality of first light signals.

10. The virtual image display system of claim 1, further comprising:
a support structure wearable on a head of the viewer;
wherein the first light emitter, the first light direction modifier, the first combiner, the second light emitter, the second light direction modifier, and the second combiner are carried by the support structure.

11. The virtual image display system of claim 1, further comprising:
the first light emitter to emit the plurality of first light signals to be projected into the viewer's second eye;
a second light emitter to emit a plurality of second light signals to be projected into a viewer's first eye;
a second light direction modifier to vary a light direction of the plurality of second light signals emitted from the second light emitter;
an integrated combiner to respectively redirect and converge the plurality of first light signals to the viewer's second eye and the plurality of second light signals to the viewer's first eye;
wherein the light direction of second light signals is varied at a third scan rate with respect to time within a second spatial range for displaying a second image frame with a predetermined number of light signals and the third scan rate is configured to be non-constant; and
wherein a first light signal forming a pixel on the first image frame and a corresponding second light signal forming a pixel on the second image frame display a binocular virtual image pixel at a first depth which is related to a first angle between the first light signal and the second light signal projecting into the viewer's eyes.

* * * * *